United States Patent
Ye

(10) Patent No.: US 10,578,758 B2
(45) Date of Patent: Mar. 3, 2020

(54) SEQUENCE PATTERN CHARACTERIZATION

(71) Applicant: Shin-Ju Ye, Spring, TX (US)

(72) Inventor: Shin-Ju Ye, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 314 days.

(21) Appl. No.: 15/015,864

(22) Filed: Feb. 4, 2016

(65) Prior Publication Data

US 2016/0274255 A1    Sep. 22, 2016

Related U.S. Application Data

(60) Provisional application No. 62/135,506, filed on Mar. 19, 2015.

(51) Int. Cl.
| | |
|---|---|
| *G01V 1/40* | (2006.01) |
| *G01V 3/18* | (2006.01) |
| *G01V 5/04* | (2006.01) |
| *G01V 9/00* | (2006.01) |
| *G01V 1/30* | (2006.01) |
| *G06K 9/52* | (2006.01) |
| *G06K 9/00* | (2006.01) |

(52) U.S. Cl.
CPC .......... *G01V 1/30* (2013.01); *G06K 9/00523* (2013.01); *G06K 9/527* (2013.01); *G01V 2210/23* (2013.01)

(58) Field of Classification Search
None
See application file for complete search history.

(56) References Cited

U.S. PATENT DOCUMENTS

| | | | |
|---|---|---|---|
| 6,012,017 A | 1/2000 | Van Bemmel et al. | |
| 6,366,859 B1 | 4/2002 | Rabiller et al. | |
| 6,654,692 B1 * | 11/2003 | Neff ...................... | G01V 1/306 |
| | | | 702/11 |
| 6,745,129 B1 | 6/2004 | Li et al. | |
| 7,280,932 B2 | 10/2007 | Zoraster et al. | |

(Continued)

OTHER PUBLICATIONS

Van Dorp, J. R., et al., (2000), "Solving for the Parameters of a Beta Distribution Under Two Quantile Constraints", Journal of Statistical Computation and Simulation, vol. 67, pp. 189-201.*

(Continued)

*Primary Examiner* — Calvin Y Choi
(74) *Attorney, Agent, or Firm* — ExxonMobil Upstream Research Company-Law Department

(57) ABSTRACT

A method, including: obtaining a scale-depth or scale-time phase image of a continuous wavelet transform of an input signal, the scale-depth or scale-time phase image including oval-shaped circular patterns observed on the mirrored phase image; and extracting, with a computer, hierarchical multiscale intervals from the scale-depth or scale-time phase image, wherein the hierarchical multiscale intervals correspond to the oval-shaped circular patterns observed on the mirrored scale-depth or scale-time phase image of the continuous wavelet transform of the input signal. Another method includes: characterizing, with a computer, curve shapes of intervals of a signal using beta distribution; and visualizing and analyzing, with the computer, shape parameters of the curve shapes on a shape-parameter crossplot.

10 Claims, 18 Drawing Sheets

(56) References Cited

U.S. PATENT DOCUMENTS

| | | | |
|---|---|---|---|
| 7,424,365 | B2 | 9/2008 | Hassan et al. |
| 7,616,524 | B1 | 11/2009 | Gersztenkorn |
| 7,649,805 | B2 | 1/2010 | Bose et al. |
| 7,873,476 | B2 | 1/2011 | Thorne |
| 8,019,702 | B1* | 9/2011 | Gargi ................ G06K 9/00523 706/12 |
| 8,090,730 | B2 | 1/2012 | Shahabi et al. |
| 8,185,316 | B2 | 5/2012 | Alam et al. |
| 9,323,974 | B2* | 4/2016 | Yoshida ............... H04N 19/635 |
| 2004/0066879 | A1* | 4/2004 | Machida ............... G06T 11/006 378/4 |
| 2006/0031017 | A1* | 2/2006 | Mathieu ................... G01V 3/20 702/6 |
| 2006/0129322 | A1* | 6/2006 | MacGregor ............ G01V 3/083 702/13 |
| 2007/0160007 | A1* | 7/2007 | Wang ................ H04W 36/0083 370/331 |
| 2009/0110033 | A1* | 4/2009 | Shattil .................. H04B 1/7174 375/141 |
| 2013/0037419 | A1* | 2/2013 | Parker ..................... G01Q 60/42 205/766 |
| 2015/0338550 | A1* | 11/2015 | Wadsley ................. E21B 43/00 703/2 |
| 2016/0100152 | A1* | 4/2016 | Park ........................ G06T 19/00 382/154 |

OTHER PUBLICATIONS

Van Wagoner, J.C., et al., (1990), "Siliciclastic Sequence Stratigraphy in Well Logs, Cores, and Outcrops: Concepts for High-Resolution Correlation of Time and Facies", AAPG Methods in Exploration Series, No. 7, 76 pgs.

Vail, P.R., et al., (1991), "An Integrated Approach to Exploration and Development in the 90's: Well Log-Seismic Sequence Stratigraphy Analysis", Transactions Gulf Coast Association of Geological Societies, vol. XLI, pp. 630-650.

Hoyle, I.B., (1986), "Computer Techniques for the Zoning and Correlation of Well-Logs", Geophysical Prospecting, vol. 34, pp. 648-664.

Testerman, J.D., (1962), "A Statistical Reservoir-Zonation Technique", Petroleum Transactions, SPE 286, pp. 889-893.

Gill, D., (1970), "Application of a Statistical Zonation Method to Reservoir Evaluation and Digitized-Log Analysis", The American Association of Petroleum Geologists Bulletin, V. 54, No. 5, pp. 719-729.

Hawkins, D.M. & ten Krooden, J.A. (1979), "A Review of Several Methods of Segmentation", in *Computer & Geology*, vol. 3, pp. 117-126.

Hruska, M., et al., (2009), "Automated Segmentation of Resistivity Image Logs using Wavelet Transform", in *Math. Geosci.* 41: pp. 703-716.

Mallat, S. and Hwang, W.L. (1992), "Singularity detection and processing with wavelets", in *IEEE Trans. Inf. Theory*, vol. 38, No. 2, pp. 617-643.

Mehta, C.H., et al., (1990), "Segmentation of Well Logs by Maximum-Likelihood Estimation", in *Mathematical Geology*, vol. 22, No. 7, pp. 853-869.

Morlet, J. (1981), "Sampling theory and wave Propagation", *Proc. 51st Ann. Intern. Meeting of Soc. of Exp. Geophysicists*; pp. 233-261.

Morlet, J. et al., (1982), Wave propagation and sampling theory-Part I, in *Geophysics* vol. 47, No. 2 pp. 203-221.

Morlet, J. et al., (1982), Wave propagation and sampling theory-Part II, in *Geophysics* vol. 47, No. 2 pp. 222-236.

Robail, P. et al., (2001), "Sedimentary Bodies Identification Using the Phase Coefficients of the Wavelet Transform", in *SPWLA* 42nd Ann. Log. Symp. paper VV, pp. 1-12.

Serra, O. & Sulpice, L. (1975), "Sedimentological Analysis of Shale-Sand Series from Well Logs", in SPWLA 16th Annual Logging Symposium, paper W, pp. 1-23.

Serra, O. & H.T. Abbott, H.T. (1982), "The Contribution of Logging Data to Sedimentology and Stratigraphy", in *SPE Journal*, SPE 9270, pp. 117-131.

Tu, C. L. & W.L. Hwang, W.L., (2005), "Analysis of Singularities from Modulus Maxima of Complex Wavelets", in IEEE Trans. Inf. Theory, vol. 51, No. 3, pp. 1049-1062.

Velis, D.R., (2007), "Statistical Segmentation of Geophysical Log Data", in *Math Geol* 39: 409-417.

Vermeer, P.L. & J.A.H. Alkemade, J.A.H., (1992), "Multiscale Segmentation of Well Logs", *Mathematical Geology*, vol. 24 No. 1, pp. 27-43.

Witkin, A.P. (1984), "Scale-Space Filtering", *IEEE International Conference on Acoustics, Speech and Signal Processing*, vol. 9, pp. 329-332.

Ye, S.J. & Rabiller, P., (2000) "A New Tool for Electro-Facies Analysis: Multi-Resolution Graph-Based Clustering", SPWLA Annual Logging Symmposium, papter PP, pp. 1-14.

Ye, S.J. & Rabiller, P. (2005) "Automated Electrofacies Ordering", in *Petrophysics*, vol. 46, No. 6, pp. 409-423.

\* cited by examiner

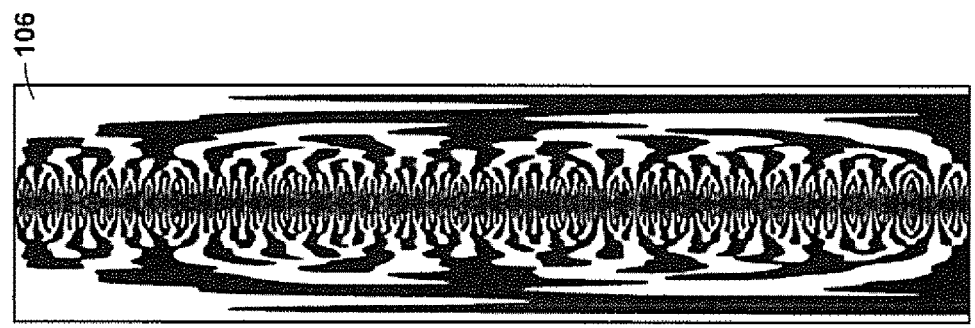
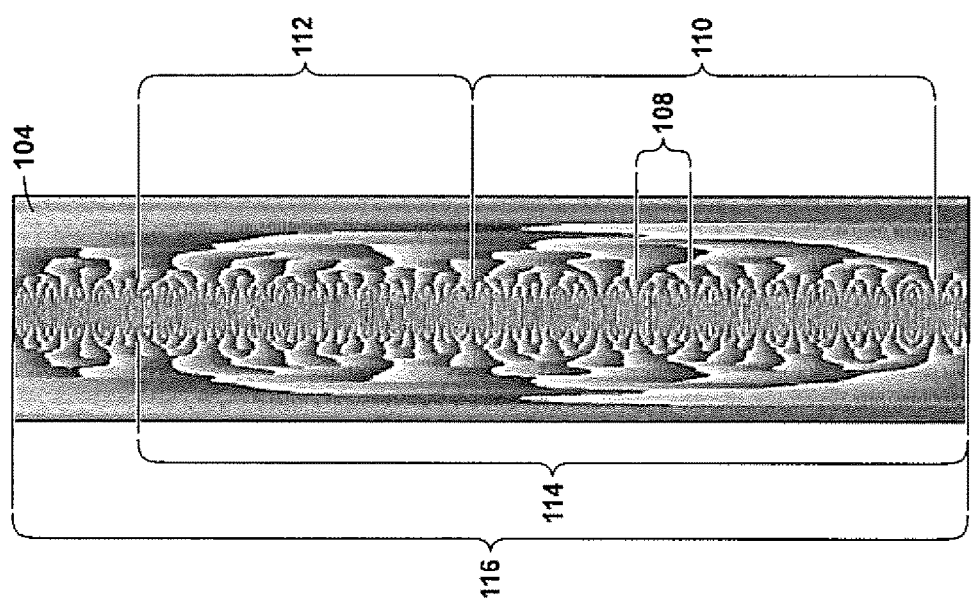
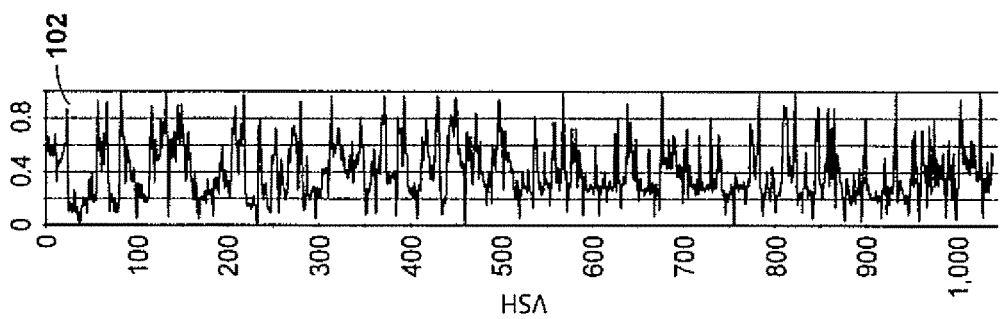
FIG. 1

SEQUENCE PATTERN CHARACTERIZATION

CROSS-REFERENCE TO RELATED APPLICATION

This application claims the benefit of U.S. Provisional Patent Application 62/135,506 filed Mar. 19, 2015 entitled SEQUENCE PATTERN CHARACTERIZATION, the entirety of which is incorporated by reference herein.

TECHNOLOGICAL FIELD

The exemplary embodiments described herein relate generally to the field of hydrocarbon prospecting and reservoir delineation using petrophysics techniques in processing of well logs. Specifically, exemplary embodiments described herein pertain to a method for subdividing well logs into multiscale intervals.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Walther's law, named after the geologist Johannes Walther, states that the vertical succession of facies reflects lateral changes in environment. When a depositional environment migrates laterally, sediments of one depositional environment come to lie on top of another. This is the basic stratigraphic concept, integrated with seismic information, allowing petroleum geologists to correlate and extrapolate the detailed geological information obtained from vertical wells throughout the large volume of three-dimensional (3-D) subsurface reservoirs.

Well logs are the most commonly available data in all the wells and are obtained with the use of known well logging tools. When a sufficient number of wells are available, coupling with core data, the interpretation of well-log patterns using sequence stratigraphy concepts provides ultra-high-resolution chronostratigraphic framework for subsurface correlation (J. C. Van Wagoner, et al., 1990, *Siliciclastic Sequence Stratigraphy in Well Logs, Cores, and Outcrops: Concepts for High-Resolution Correlation of Time and Facies in Methods in Exploration Series of AAPG book No. 7*).

Well-log signal styles, trends and breaks are used to delineate reservoir intervals. These intervals correspond to genetically related geological packages which are used to sketch the framework of the 3-D geobodies. The constituents of the geobodies characterized by internal stacking patterns within intervals are described by well-log curve shapes to reflect the vertical evolution of depositional facies and rock properties.

Well-log correlations include the following three steps:
(1) Subdivide well logs into genetic intervals (or packages) to identify the hierarchy and significance of the stratigraphic boundaries (or framework surfaces);
(2) Characterize stacking patterns between surfaces (or within intervals) to reflect the vertical evolution of depositional facies and rock properties; and
(3) Correlate the well logs to build chronostratigraphic framework based on sequence stratigraphic concept (system tracts, etc.) and information from all sources of data such as seismic, logs, cuttings, cores, etc.

The interpretation in the last step of well-log correlation is complicated, geological environment dependent and often subjective. It requires expert knowledge, geological concept, and integration of various data including seismic, logs, cuttings, cores, etc. (P. Vail & W. Wornardt Jr., 1991, *An Integrated Approach to Exploration and Development in the 90's: Well Log-Seismic Sequence Stratigraphy Analysis*, in *Transactions Gulf Coast Association of Geological Societies, Vol. XLI*). This process can only be automated if one is able to quantify all sources of information as proficient as human's interpretation including expert knowledge and geological concept, which currently is still an interpretive observation, based natural science. Most of the automated well-log correlation techniques were based on single-curve-shape similarity and simple expert rules (U.S. Pat. No. 7,873,476B2, U.S. Pat. No. 7,280,932B2, U.S. Pat. No. 6,012,017A). They can only apply to nearby wells penetrating geobodies of minor geological variations in a specific geological environment. Interpreter's complex and implicit qualitative information from all sources of data is difficult to integrate and translate into algorithms. Up to now, well-log correlation process is still performed manually by stratigraphers.

Quantification of well-log patterns could provide fast, objective and consistent interpretation. Attempts to automate this process have been published since 1960's. Some authors focused on developing algorithms zoning (or segmenting) the well logs, others directly focused on correlating the wells based on similarity of well-log shapes and patterns. Several articles provided good overviews of well-log zonation and well-log correlation techniques: B. R. Shaw & J. M. Cubitt, 1979, *Stratigraphic Correlation of Well Logs: An Automated Approach*, in *Computer & Geology, Vol. 3*; I. B. Hoyle, 1986, *Computer Techniques for the Zoning and Correlation of Well-Logs*, in *Geophysical Prospecting* 34, 648-664; J. H. Doveton, 1994, *Chapter 6: Lateral Correlation and Interpretation of Logs*, in *Geologic Log Analysis Using Computer Methods, AAPG book*; S. M. Luthi, 2001, *Section 3.4 Well Correlation*, in *Geological Well Logs*, Springer-Verlag.

Well-Log Zonation
  Statistical Approach
  Well-log zonation is a critical pre-processing step in well-log correlation. Statistical segmentation (or zonation) techniques received considerable attention in the 1900's literature. However, this approach simply subdivides the well logs into intervals without the capability of identifying the hierarchy and significance of stratigraphic boundaries from log signals. Its fundamental principle is to minimize the variance within each zone and maximize the variance between the zones. Many variations of statistical approach have been published and improved throughout several decades, and they differ from each other in statistical criteria, uni- or multi-variate models, and optimization techniques, etc.: J. D. Testerman, 1962, *A Statistical Reservoir-Zonation Technique*, in *SPE* 286; D. Gill, 1970, *Application of a Statistical Zonation Method to Reservoir Evaluation and Digitized-Log Analysis*, in *AAPG Bulletin, Vol. 54. No. 5*; D. M. Hawkins & J. A. ten Krooden, 1979, *A Review of Several Methods of Segmentation*, in *Computer & Geology, Vol 3*; C. H. Mehta et al., 1990, *Segmentation of Well Logs by Maximum-Likelihood Estimation*, in *Mathematical Geology, Vol. 22, No. 7*; D. R. Velis, 2007, *Statistical Segmentation of Geophysical Log Data*, in *Math Geol* (2007) 39: 409-417.

Multiscale Wavelet Transform Approach

In the last two decades, methods based on multiscale wavelet transform techniques for identifying multiscale singularities (or discontinuities/edges) in signals became popular in the literature. The mathematical formalism of the continuous wavelet transform was first introduced by Morlet in 1981 and 1982 (J. Morlet, 1981, *Sampling theory and wave Propagation, Proc. 51st Ann. Intern. Meeting of Soc. of Exp. Geophysicists*; Morlet et al., 1982, *Wave propagation and sampling theory-Part I and Part II, in Geophysics Vol* 47, no. 2 pp. 203-221 & 222-236).

Witkin in 1984 presented a "scale-space filtering" technique using derivatives of Gaussian (DOG) multiscale transform to generate scale-space image from a one-dimensional signal (A. P. Witkin, 1984, *Scale-Space Filtering, IEEE ICASSP*), then described a "coarse-to-fine tracking" method to locate singular points (i.e. zero-crossings in the second derivative) at coarse scales and track them down to fine scales on a scale-space image, and finally represented the hierarchy of signal boundaries by an "interval tree" to subdivide a signal with an optimal scale at each section. Vermeer and Alkemade applied Witkin's method to segment well logs in different scales (P. L. Vermeer & J. A. H. Alkemade, 1992, *Multiscale Segmentation of Well Logs, Mathematical Geology*, 24-1). Mallat and Hwang in 1992 formulated this concept into a popular method: Wavelet Transform Modulus Maxima (WTMM) to characterize the singular behavior of functions (S. Mallat and W. L. Hwang, 1992, *Singularity detection and processing with wavelets, in IEEE Trans. Inf. Theory*, vol. 38, no. 2, pp. 617-643). DOG wavelets are real-valued functions. Tu and Hwang in 2005 extended WTMM method to complex-valued wavelets (C. L. Tu & W. L. Hwang, 2005, *Analysis of Singularities from Modulus Maxima of Complex Wavelets, in IEEE Trans. Inf. Theory*, vol. 51, no. 3, pp. 1049-1062).

Robail et al. in 2001 proposed a method using the scale-depth phase image of a complex-valued Morlet continuous wavelet transform (CWT) to process well-log signals (F. Robail et al., 2001, *Sedimentary Bodies Identification Using the Phase Coefficients of the Wavelet Transform, in SPWLA 42$^{nd}$ Ann. Log. Symp. paper VV*). As the well log signals are measured in depth, the wavelet transformed image is a scale-depth representation of well logs. The features exhibited on a CWT phase image of a well-log signal bring out multiscale intervals (or geological packages) and their hierarchical relationships. However it is not a trivial task to automatically extract the features revealed by the CWT phase image. Similar to Witkin's process, Robail et al. tracked the phase lines (where the phase values change signs) on the CWT phase image, and then represented the boundary hierarchy with Witkin's interval tree to subdivide the well log signals. More details about their method is discussed below.

U.S. Pat. No. 6,366,859 ("Method of Detecting Breaks in Logging Signals Relating to a Region of a Medium") describes a simple method for detecting breaks in well-log signals. The technique first calculates the absolute value of the mean gradient of the characteristic quantity of the wavelet transform of well logs, and then selects the peaks as breaks.

Hruska et al. in 2009 used discrete wavelet transform (DWT) with Daubechies' wavelet to segment the borehole image logs (M. Hruska et al., 2009, *Automated Segmentation of Resistivity Image Logs using Wavelet Transform, in Math. Geosci.* 41: 703-716). CWT can accurately locate the boundaries in a signal, however, the boundaries generated from DWT can only occur at positions which are multiples of $2^L$, where L is the scale used, i.e. the DWT boundaries do not always lie in the correct location.

Characterization of Curve Patterns Between Surfaces

The curve-shape patterns of well logs have been classified and related to sedimentological phenomena for sand-shale formations (J. C. Van Wagoner, et al., 1990). By analyzing the lower and upper bedding contacts and the shape of the curve, the log curve shapes can be characterized in shapes of cylinder, bell, funnel, egg, smooth, serrated, concave, convex, etc. (O. Serra & L. Sulpice, 1975, *Sedimentological Analysis of Shale-Sand Series from Well Logs, in SPWLA 16$^{th}$ Annual Logging Symposium, paper W*; O. Serra & H. T. Abbott, 1982, *The Contribution of Logging Data to Sedimentology and Stratigraphy, in SPE Journal*).

The quantification of curve shapes has not received much attention in the literature. Simple linear regression of well logs was commonly used for determining fining-upward and coarsening-upward sequences. Statistical methods have been proposed in the literature (C. Reiser, 1998, *Identification des Corps Sedimentaires et des Sequences Stratigraphiques par l'Analyse Numerique des Formes Diagraphiques*, French PhD Thesis, University of Lyon I; F. Robail et al., 2001, *SPWLA paper VV*). They first extracted statistical parameters such as the sign and absolute value of the slope and kurtosis and skewness of the curves defined by bedding intervals, then Reiser represented the parameters in spider plots for each type of curves, and Robail et al. partitioned the parameters into groups. These statistical methods provide "relative" quantification of curve shapes, and their representations (spider plots, colored patterns, etc.) are impractical for multi-well interpretation and/or to extend the knowledge to different fields.

SUMMARY

A method, including: obtaining a scale-depth or scale-time phase image of a continuous wavelet transform of an input signal; and extracting, with a computer, hierarchical multiscale intervals from the scale-depth or scale-time phase image, wherein the hierarchical multiscale intervals correspond to oval-shaped circular patterns associated with a mirrored version of the scale-depth or scale-time phase image of the continuous wavelet transform of the input signal.

The method can further include identifying, within the input signal, intervals of distinct signal styles using the extracted hierarchical multiscale intervals.

In the method, a wavelet scale of the continuous wavelet transform can have a sufficiently large wavelet scale so that an entirety of the input signal is incorporated within one single oval shape of the scale-depth or scale-time phase image.

In the method, the extracting can include using a watershed method.

In the method, the watershed method can include binarizing the scale-depth or scale-time phase image using progressively increasing thresholds, and analyzing changes of patterns on binarized images of different thresholds.

In the method, the analyzing can include establishing connections between the oval-shaped circular patterns in the binarized images of different thresholds and combining the connected areas of the different thresholds to extract the hierarchical multiscale intervals.

In the method, the input signal can be a well log signal and the oval-shaped circular patterns can correspond to intervals of genetically related geological packages.

In the method, the intervals of distinct signal styles can correspond to different stratigraphic packages.

In the method, extracting hierarchical multiscale intervals from the scale-depth or scale-time phase image can include using a significance-of-cone method, which instead directly extracting the significance of the smoothed cones located at the tops and bottoms of the ovals, wherein the significance-of-cone method can integrate boundary information embedded in different types of well logs by extracting a significance-of-cone (SOC) curve from each well log, which reduces the boundary location information from multiple phase images of an input signal into one single value per depth, then combines the SOC curves from different wells logs, and then derives the hierarchical boundaries from the integrated SOC curve.

The method can further include visualizing and analyzing curve shapes of the input signal within the intervals using shape parameters of beta distribution on a shape-parameter cross-plot.

The method can further include representing curve shapes from intervals of multiple wells on a shape-parameter crossplot.

A method comprising: characterizing, with a computer, curve shapes of intervals of a signal using beta distribution; and visualizing and analyzing, with the computer, shape parameters of the curve shapes on a shape-parameter crossplot.

In the method, beta-distribution parameters can be approximated numerically using a two-quantile constraint method in combination with an optimization scheme which selects optimal upper and lower quantiles for a given interval of the signal by minimizing an average of squared residuals between original and fitted curves.

In the method, the signal can be a well log signal.

In the method, the visualizing can include visualizing and analyzing shape parameters for multi-well intervals on the shape-parameter crossplot.

A non-transitory computer readable storage medium, encoded with instructions, which when executed by a computer causes the computer to implement a method comprising: obtaining a scale-depth or scale-time phase image of a continuous wavelet transform of an input signal; and extracting, with a computer, hierarchical multiscale intervals from the scale-depth or scale-time phase image, wherein the hierarchical multiscale intervals correspond to the oval-shaped circular patterns associated with a mirrored version of the scale-depth or scale-time phase image of the continuous wavelet transform of the input signal.

A non-transitory computer readable storage medium, encoded with instructions, which when executed by a computer causes the computer to implement a method comprising: characterizing, with the computer, curve shapes of intervals of a signal using beta distribution; and visualizing and analyzing, with the computer, shape parameters of the curve shapes on a shape-parameter crossplot.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 1 illustrates a comparison between an exemplary well-log signal, its continuous wavelet transform (CWT), and a binarized CWT phase image.

DETAILED DESCRIPTION

Figure 2:
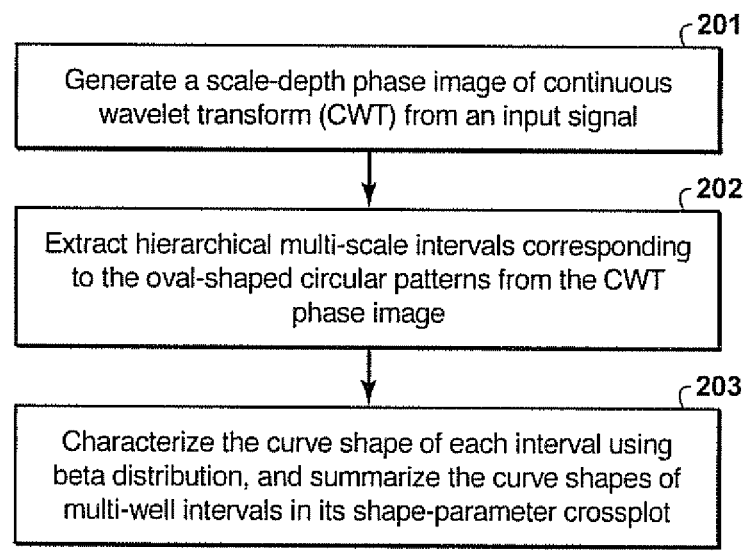
FIG. 2 illustrates an exemplary method of sequence pattern characterization.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement focuses on building a solid foundation for well-log correlation by developing mathematical tools quantifying the first two pre-processing steps of well-log correlation process, i.e. zonation and characterization of stacking patterns, which are capable of providing results equivalent or sometimes superior than human pattern recognition capability.

Well logs carry crucial geological information for building reservoir-scale geological models. Exemplary embodiments of the present technological advancement use mathematical tools to quantify one-dimensional well logs to assist (1) rapid identification of significant stratigraphic boundaries (or framework surfaces) and (2) characterize the stacking patterns between surfaces using log curve shapes reflecting vertical evolution of depositional facies and rock properties. The features exhibited on a scale-depth phase image of a continuous wavelet transform (CWT) of a well-log signal bring out multiscale intervals (or geological packages) and their hierarchical relationships. Exemplary embodiments of the present technological advancement extract the features observed on CWT phase image to subdivide well logs into multiscale intervals and preserve their hierarchical relationships. The internal stacking patterns within intervals are then characterized by log curve shapes using shape parameters of beta distribution. These new tools are capable of providing results equivalent or sometimes superior than human pattern recognition capability (human interpretation is subjective and experience related), and allows for evaluating and comparing the three-dimensional variations of internal structures of different geological formations.

FIG. 1 illustrates comparison between an exemplary input well-log signal 102 (VSH, shale volume), its scale-depth phase image of Morlet continuous wavelet transform (CWT) 104, and its binarized CWT phase image 106. To facilitate visual interpretation, the phase images 104 and 106 are mirrored so the smallest scales (highest frequencies) are at the center and the scales increase outward with the largest scales (lowest frequencies) on both left and right sides of the images 104 and 106. The mirrored CWT phase image 104 of a well-log signal 102 exhibits oval-shaped circular patterns 108, 110, 112, 114, and 116 (for example, as other oval-shaped circular patterns are depicted in image 104) that correspond to intervals of genetically related geological packages, and the embedment of these oval-shapes within one another reveals the multiscale hierarchical relationship information carried by the well log.

Figure 11:
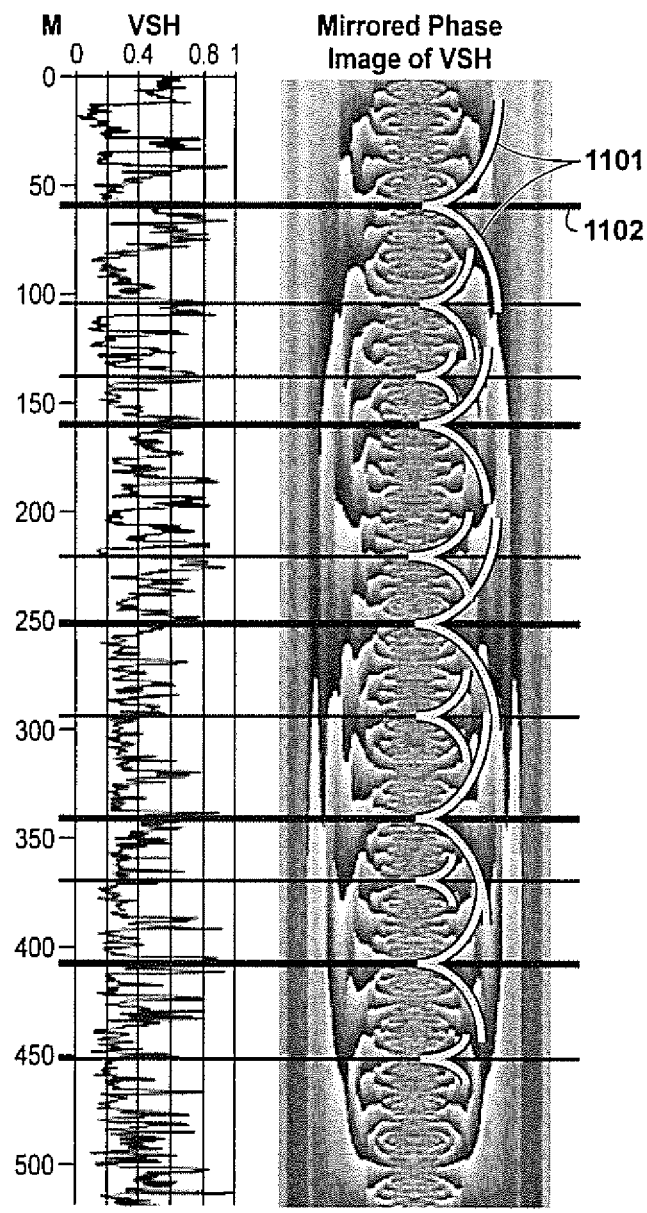
FIG. 11 illustrates exemplary smoothed cones at the boundaries of a well-log signal.

A different way to visualize the oval-shaped circular patterns on the CWT phase image is to recognize the significance of the smoothed cones located at the joining points of the adjacent ovals above and below. At the position (or depth) of an important boundary point of a signal, a large cone area with smoothed phase change opens up from small wavelet scales at the center of the mirrored phase image to large wavelet scales at both sides of the mirrored phase image. With respect to FIG. 11, at the position (or depth) of an important boundary point of a signal, a large cone area 1101 with smoothed phase change opens up from small scales at the center of the mirrored phase image. The boundaries 1102 are denoted by horizontal straight line, and the smoothed cone area are indicated by curved lines opening up above and below the boundaries (not every cone or boundary is given a reference number for clarity reasons). As shown in FIG. 11, the larger the smoothed cones, the more important the boundaries are.

While phase images are showed as mirrored phase images in the figures, a computer that is programmed to carry out the preset technological advancement does not necessarily need to create the mirrored phase images and/or display them. The mirror phase image is discussed in the present embodiments in order to more clearly explain the present technological advancement. A computer programmed to carry out the present technological advancement can operate on a phase image without mirroring (i.e., a single phase image with half ovals), wherein the computer extracts hierarchical multiscale intervals that correspond to oval-shaped circular patterns associated with a mirrored version of the phase image.

Oppenheim and Lim in 1981 demonstrated the importance of phase in signals (A. V. Oppenheim & J. S. Lim, 1981, *The Importance of Phase in Signals, in Proc. of the IEEE, vol. 69, no. 5*) where the edge (or boundary) position information is fully embedded in the phase of signals. As shown in FIG. 1, the mirrored CWT phase image 104 exhibits oval-shaped circular patterns, some of which are designated as 108, 110, 112, 114, and 116) that correspond to intervals of genetically related geological packages. Based on the visual inspection, one can trace these oval-shaped circular patterns from the large scales (low frequencies) at both sides of the phase image 104 towards the small scales (high frequencies) at the center to find the limits of each interval. The smaller scaled oval-shaped circular patterns (or intervals) are embedded within larger scaled oval-shaped circular patterns which depicts their multiscale hierarchical relationships (i.e., oval-shaped circular pattern 108 is embedded within oval-shaped circular pattern 110, which is embedded in oval-shaped circular pattern 114). The sequence hierarchy and boundaries revealed by the CWT phase image 104 of a well log 102 are consistent with the interpretation of experienced stratigraphers and exceed the capability of inexperienced ones. It provides a unique and objective way to visualize and interpret the hierarchy and significance of stratigraphic boundaries from well-log signals.

Robail et al. (*SPWLA* 2001, *paper VV*) did not extend the scales of their CWT phase image large enough to reveal the complete hierarchical relationship of the oval-shaped circular patterns, and they did not describe or use the circular patterns in their paper. Instead, like Witkin and other publications in the literature, they focused on finding the breaks (or boundaries) of the intervals, but not the intervals themselves. They tracked the phase-lines from small scales and terminated the phase-lines at local minima of CWT modulus image in large scales without closing the circles of the phase-lines to form the oval shapes (i.e. intervals) observed on a CWT phase image. Consequently, their method suffers from determining optimal interval closures in the interval-tree graph (i.e. assigning intervals from detected boundaries) to generate hierarchical relationships corresponding to human's observation.

The exemplary embodiments of the present technological advancement describe two methods capable of extracting intervals and their hierarchy represented by the oval-shapes in the CWT phase image 104. The first method directly extracts the connected areas on the CWT phase image corresponding to the oval-shaped circular features using watershed image analysis technique. The second method instead of directly extracting the ovals, quantifies the significance of smoothed cones located at the tops and bottoms of the ovals.

The internal stacking patterns within intervals are described by well-log curve shapes to reflect the vertical evolution of depositional facies and rock properties. The present technological advancement can use two shape parameters of beta distribution to characterize and quantify the complex curve shapes of well-log data. Use of the two shape parameters provides an absolute quantitative space to interpret the curve shapes where the values of curve-shape parameters are invariant from well to well and field to field. The interpretation of log curve shapes within genetic intervals on the α-β crossplot allows for evaluating and comparing the 3-D variations of internal structures of different geological formations.

FIG. 2 illustrates an exemplary method of sequence pattern characterization using the present technological advancement. Step 201 includes generating a scale-depth phase image of a continuous wavelet transform from an input signal. Step 202 includes extracting hierarchical multiscale intervals corresponding to oval-shaped circular patterns from the CWT phase image. Step 203 includes characterizing the curve shape of each interval using beta distribution, and summarizing the curve shapes of multi-well intervals in its shape-parameter crossplot. Each of the steps is further described below.

Step 201: Generate a Scale-Depth Phase Image of a Continuous Wavelet Transform from an Input Signal:

Wavelet transform of a one-dimensional signal is a two-dimensional scale-time (or scale-space) joint representation. As the well log signals are measured in depth, the wavelet transform of a well-log signal is a two-dimensional scale-depth representation. Wavelet transform provides multi-resolution analyses with dilated windows. The high-frequency analyses are performed using narrow windows, and the low-frequency analyses are generated using wide windows. The bases of the wavelet transform, the wavelets, are produced from a basic (or mother) wavelet function by dilatations and translations. The wavelets are local in both time and frequency domains. The wavelet transform is powerful for multi-resolution local spectrum analysis of non-stationary signals.

The complex-valued wavelet transform of a function $f(x) \in Z$ is a decomposition of $f(x)$ into a set of kernel functions called wavelets:

$$W_f(s,t) = \int f(x) \psi_{s,t}(x) dx \quad (1)$$

The wavelets are generated from a single basic wavelet $\psi(x)$ by scaling and translation:

$$\psi_{s,t}(x) = \frac{1}{\sqrt{s}} \psi\left(\frac{x-t}{s}\right) \quad (2)$$

where s is the scale factor and t is the translation factor.

There are many basic wavelets described in the literature. The present technological advancement is not limited to a specific basic wavelet. However, the complex-valued Morlet wavelet (Morlet et al., 1982) is chosen as the basic wavelet to demonstrate the results in the Figures. The Morlet wavelet is a localized sinusoidal wave modulated by a Gaussian window:

$$\psi(x) = \left(e^{ik_0 x} - e^{-\frac{1}{2}k_0^2}\right) e^{-\frac{1}{2}x^2} \quad (3)$$

where the parameter $k_0$ is the wavenumber associated with the Morlet wavelet, roughly corresponding to the number of oscillations of the wavelet. The term $e^{ik_0 x}$ is the sinusoidal wave. The term $e^{-1/2k_0^2}$ is the admissibility correction term which gives the Fourier transform of the wavelet zero at zero frequency; equivalently, the wavelet in time domain has a zero-integral (or zero-mean) value. The term $e^{-1/2x^2}$ is the Gaussian modulated window.

Based on the definition of a complex number, the amplitude A of the wavelet transform of signal $f$ is:

$$A_f(s,t) = \sqrt{Re(W_f(s,t))^2 + Im(W_f(s,t))^2} \quad (4)$$

and the phase θ of the wavelet transform of signal $f$ is:

$$\theta_f(s,t) = \arctan\left[\frac{Im(W_f(s,t))}{Re(W_f(s,t))}\right] \quad (5)$$

where Re ($W_f(s,t)$) is the real part of complex wavelet decomposition coefficient of signal $f$, and the Im($W_f(s,t)$) is the imaginary part of complex wavelet decomposition coefficient of signal $f$.

FIG. 1 shows an example result of the scale-depth phase image of Morlet CWT 104 in the middle, which was processed from the input signal 102 (VSH, shale volume) on the left. The image on the right is a binarized phase image 106. The phase images in FIG. 1 are generated using the wavelet scales $s = 2\pi\delta^2$, where s increases exponentially from a predefined minimum scale $s_{min}$ (displayed at the center of the mirrored phase image) to a predefined maximum scale $s_{max}$ (displayed at both sides of the mirrored phase image), with δ being a fixed valued increment.

In this step 201, the wavelet scale has been increased so the entire well log signal $f$ is incorporated within one single oval shape 116 as shown on the CWT phase image 104 of FIG. 1. In thus doing, the complete hierarchical relationship of the stratigraphic framework carried by the entire section of the well log can be analyzed. While the technique discussed in Robail et al. is different from the present technological advancement for several reasons, one difference between the two is that Robail et al. did not use an increased wavelet scale so that the entire well log signal is incorporated within one single oval shape; nor did Robail et al. recognize any need to do so or any advantage in doing so.

The computational complexity of direct CWT wavelet convolution exponentially increases with the number of data points, N, in the input signal in the order of ($N^2$). Therefore, in practice, the CWT phase images are calculated via fast Fourier transform (FFT) which reduces the computational complexity of the convolution to the order of (N log N). Since the FFT requires the number of input data points to be the power of 2, zeros are padded before and after the original signals.

Step 202: Extract Hierarchical Multiscale Intervals Corresponding to Oval-Shaped Circular Patterns from the CWT Phase Image:

As described previously, the oval-shaped circular patterns on the mirrored CWT phase image correspond to intervals of genetically related geological packages and the embedment of these oval-shapes within one another reveals the multiscale hierarchical relationship information carried by the well log. This step can extract all of these multiscale intervals observed on the phase image and preserve their hierarchical relationships.

The extracted hierarchical multiscale intervals correspond to oval-shaped circular patterns associated with a mirrored version of the scale-depth or scale-time phase image of the continuous wavelet transform of the input signal. As noted above, the mirror phase image is not necessarily created and/or displayed by a computer programmed to carry out the present technological advancement.

Two different approaches are described herein to extract intervals and their hierarchy represented by the oval-shapes. The first method directly extracts the connected areas on the CWT phase image corresponding to the oval-shaped circular features using watershed image analysis technique. The second method extracts the information carried by the ovals by quantifying the significance of smoothed cones located at the tops and bottoms of the ovals. These two methods are detailed below.

Figure 4:
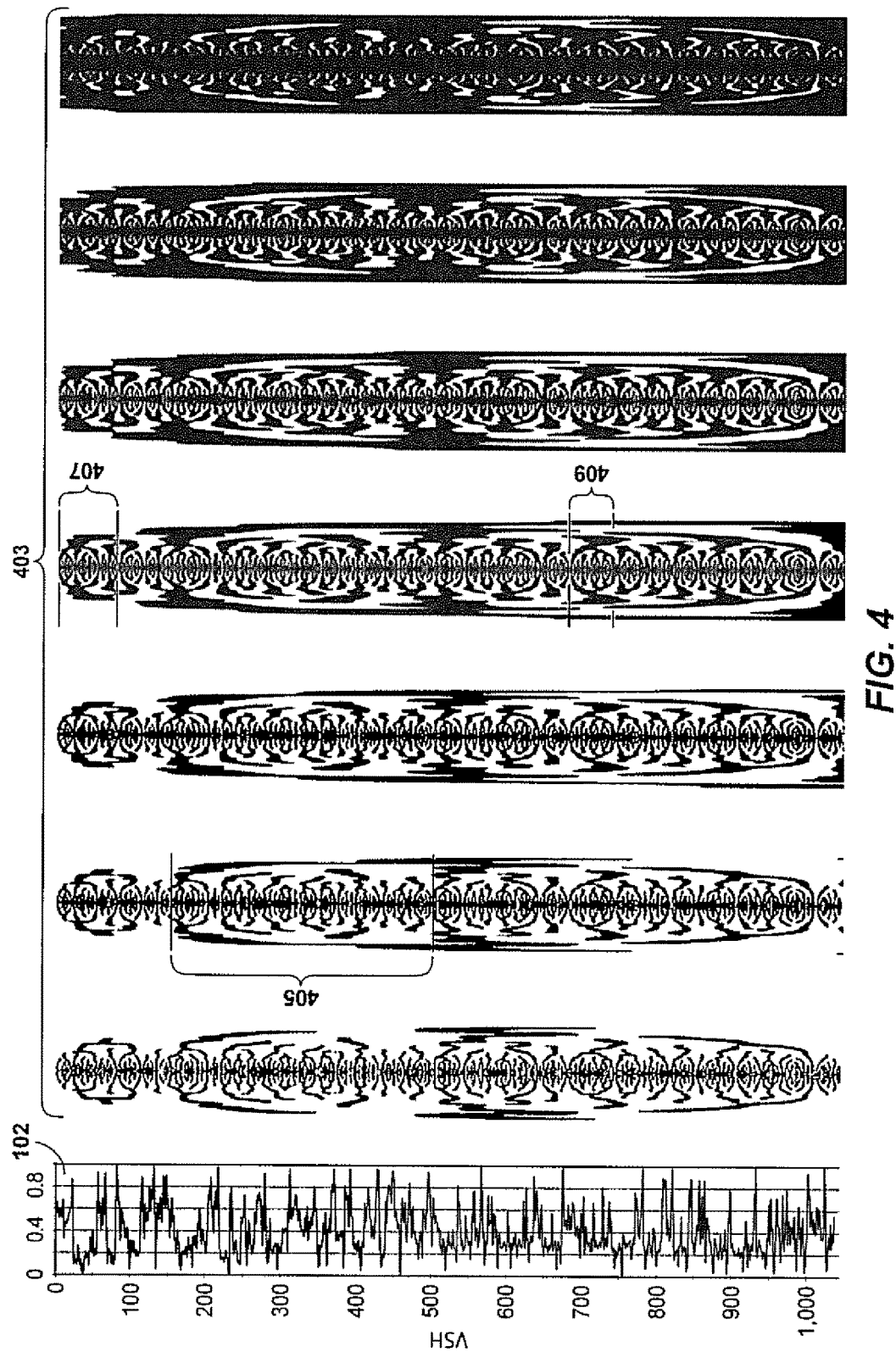
FIG. 4 illustrates a comparison between a well-log signal and binarized CWT phase images.

Watershed Method:

Watershed image analysis technique is utilized to extract the connected areas on the phase image which correspond to the oval shaped circular features in our visual perception. Watershed method binarizes the image using progressively increased thresholds, and analyzes the gradual changes of the patterns on the binarized image from different thresholds. FIG. 4 shows some binarized CWT phase images 403 using different thresholds where the thresholds increase from left to right. The left most track in FIG. 4 is the input well log signal 102. One can observe that different oval shapes form connected areas at different threshold levels. The connected areas (405, 407, and 409 for example) on the binarized images correspond to the oval shaped circular features, which are the geological intervals that one is interested in extracting from the phase image. By combining connected areas of different thresholds, all oval shapes can be extracted.

Considering the image as a geographic land and its pixel values corresponding to the altitudes of the land, watershed method can be analogous to slowly flooding the land by water. Increasing water levels during the flood corresponds to increasing the thresholds on the image. Then a connected area on the image with pixel values lower than the threshold is comparable to a lake. At low water level, many small lakes are separated from each other. As the water level gradually increases, these disconnected lakes merge with one another little by little based on the natural geographic relief (i.e. features on the image). The connected areas merging into one another build hierarchical relationship of the oval shapes observed on the CWT phase image.

Therefore, the multiscale geological intervals obtained from this method are optimal, complete (i.e. all the multiscale intervals observed on the phase image can be extracted), their hierarchical relationships are preserved, and without any preset parameters.

Figure 3:
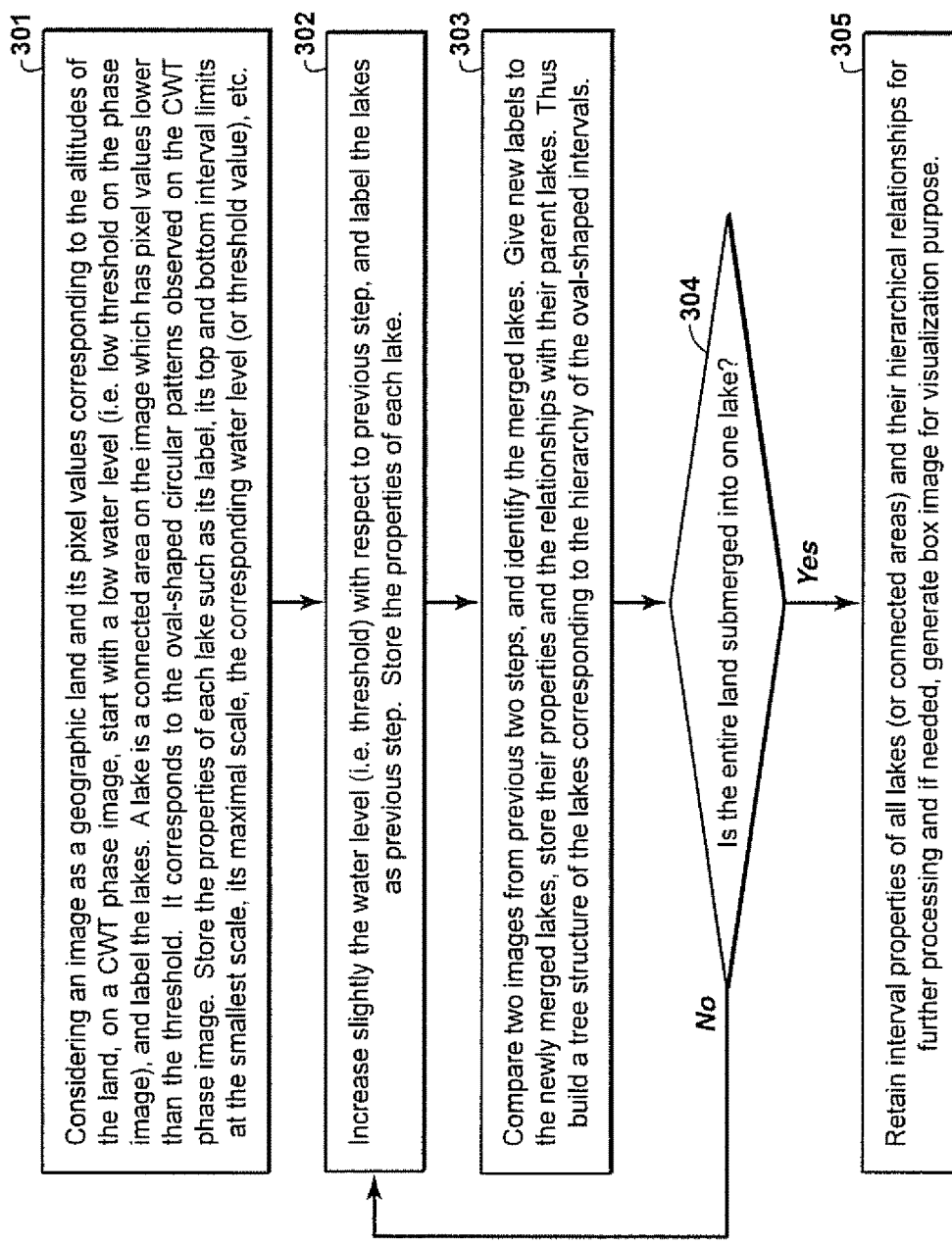
FIG. 3 illustrates an exemplary watershed method used to extract hierarchical multiscale intervals.

The watershed method extracting multiscale intervals from the CWT phase image is described below and the corresponding flowchart is presented in FIG. 3.

Step 301 starts with a low water level (i.e. low threshold on the phase image), and labels the lakes. A lake is a connected area on the image which has pixel values lower than the threshold. Step 301 includes storing the properties of each lake, such as its label, its top and bottom interval limits at the smallest scale, its maximal scale, the corresponding water level (or threshold value), etc. in a computer readable storage medium.

Step 302 includes slightly increasing the water level (i.e. threshold) with respect to the previous step, and labeling the lakes and properties as in previous step. The thresholds are increased in a manner to be able to extract the intervals. The step size for the thresholds can be set small enough to be able to detect the merging of distinct and significant (or desired) intervals. When the step size is too small, no significant merging activity may be detected and computational time increases. An optimal step size for the thresholds can be set after a few tests with different step sizes, and works for most of the well logs. Step 302 can also include storing the properties of each lake in a computer readable storage medium.

Step 303 includes comparing the two images from the previous two steps, and identifying the merged lakes. New labels are given to the newly merged lakes, and their properties and the relationships with their parent lakes are stored. For example, a comparison between the two left most binarized images in FIG. 4 reveal the formation of lake (oval) 405 with multiple parent lakes (ovals) embedded therein. Thus, this step can build a tree structure of the lakes corresponding to the hierarchy of the oval-shaped intervals.

Step 304 includes repeating steps 302 and 303 until the entire land is submerged into one lake (i.e., all pixel values of the image are smaller than the threshold; an entirely black image).

Step 305 includes retaining interval properties and their hierarchical relationships for further processing and if needed, generating box image for visualization purposes.

Figure 5:
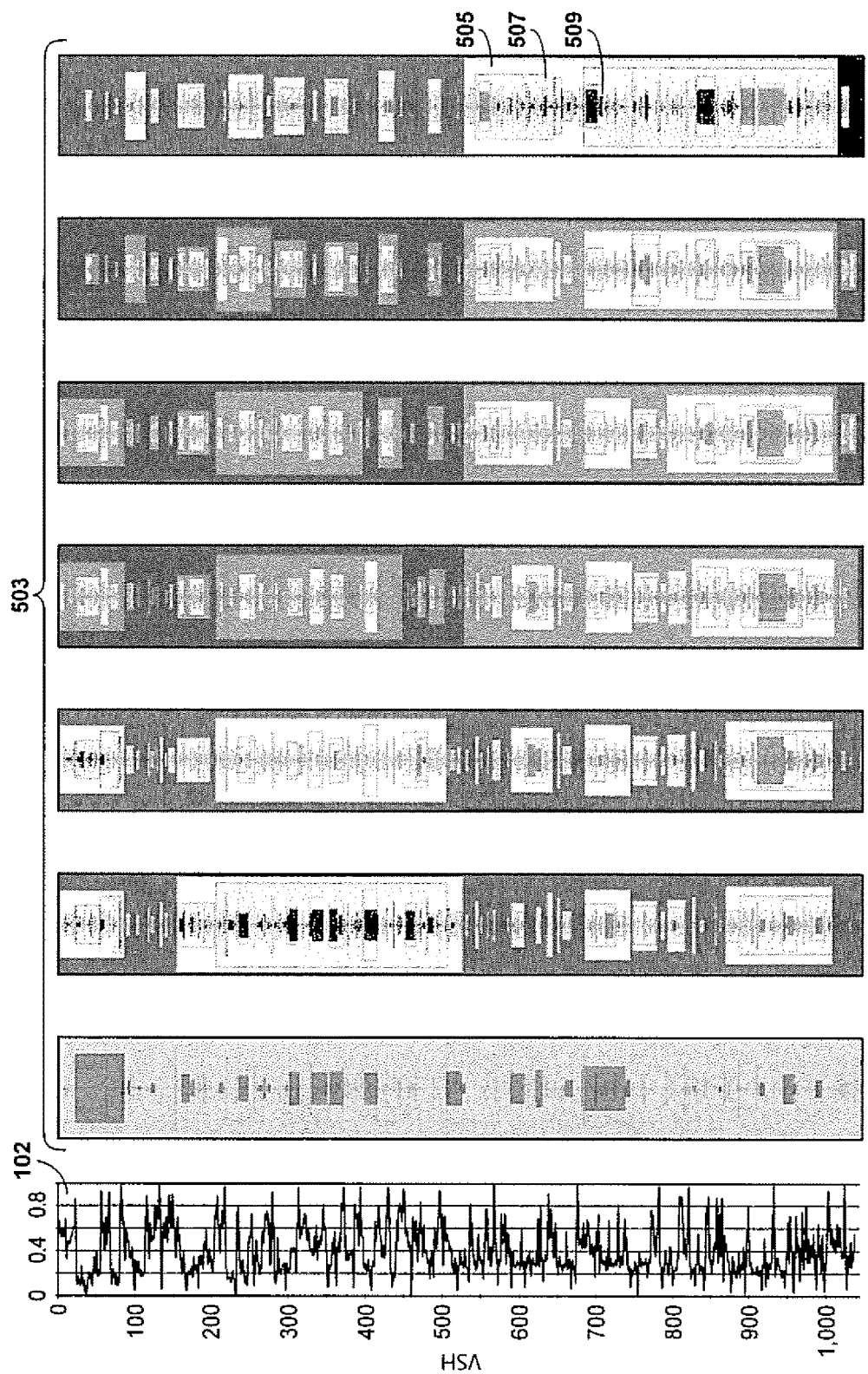
FIG. 5 illustrates an exemplary intermediate watershed box images compared to a well-log signal.

Some intermediate watershed box images 503 are displayed in FIG. 5. The boxes (505, 507, and 509 for example) represent the connected areas extracted from binarized CWT phase images 403 in FIG. 4 with corresponding order. An appreciation for how the watershed method identifies the lakes (ovals) may be better appreciated by comparing FIG. 5 to FIG. 4, wherein the boundaries and hierarchy of the boxes in FIG. 5 correspond to the boundaries and hierarchy of the lake (ovals) in FIG. 4. These box images in FIG. 5 are also mirrored images (like the mirrored phase image) with the smaller scales at the center and larger scales on left and right sides. The tops and bottoms of the boxes are the limits of the connected areas (or intervals), and the widths correspond to the maximal scales of the connected areas on the phase image.

FIG. 5 also illustrates an interesting pattern. In the six right-most watershed box images, the upper half, moving from left to right, generally trends from larger boxes to smaller boxes. In the six right-most watershed box images, the lower half, moving from right to left, generally trends from larger boxes to smaller boxes.

Figure 6:
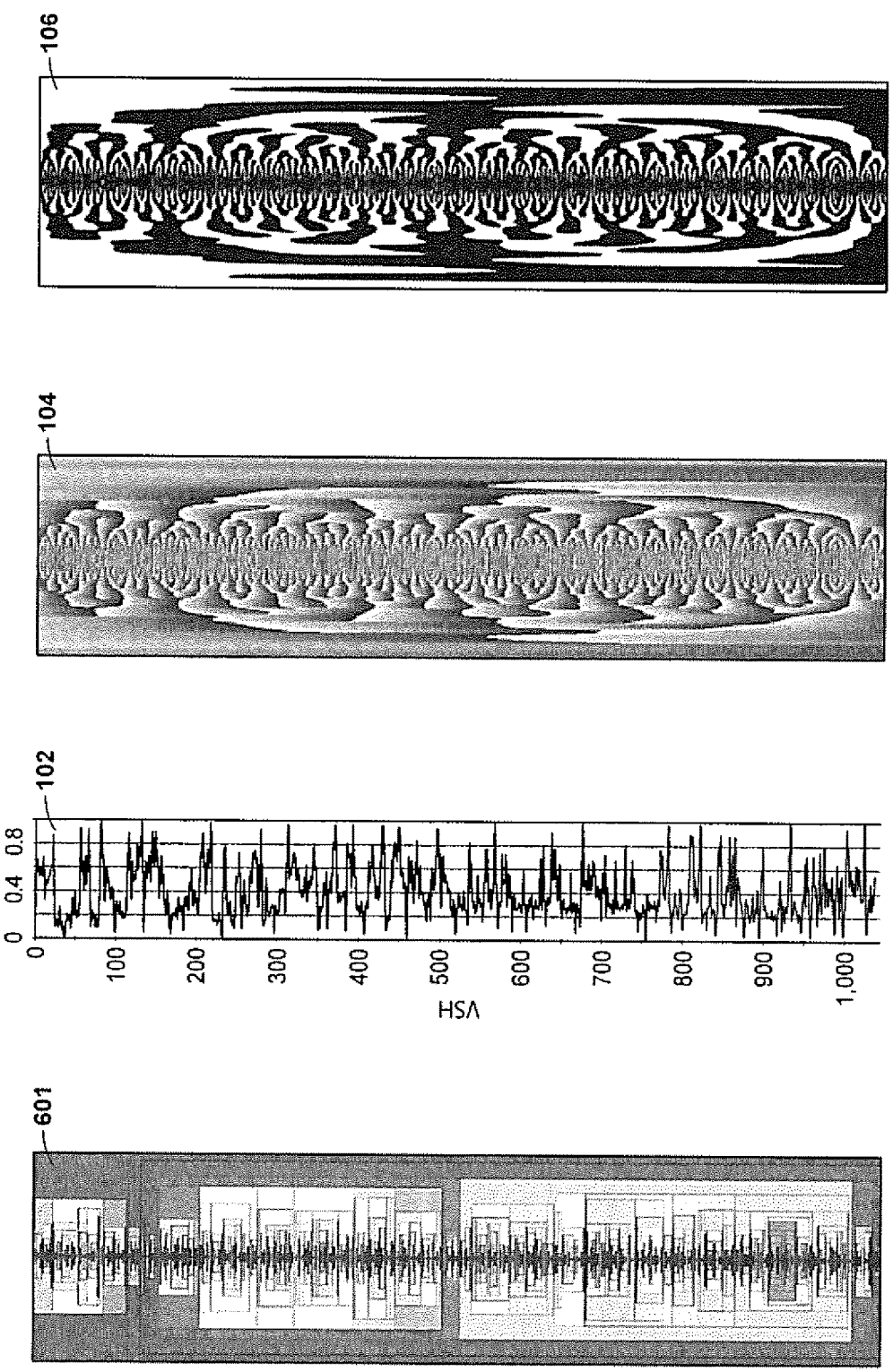
FIG. 6 illustrates a comparison of a final watershed box image, a well-log signal, a CWT phase image, and a binarized CWT phase image.

FIG. 6 displays an example of a final watershed box image 601 on the left-most track which includes all the intervals extracted from binarized CWT phase images of different thresholds in watershed method. The three tracks on the right are the same as in FIG. 1. Each box represents an interval. The boxes are embedded into each other based on their hierarchical relationships.

Figure 7:
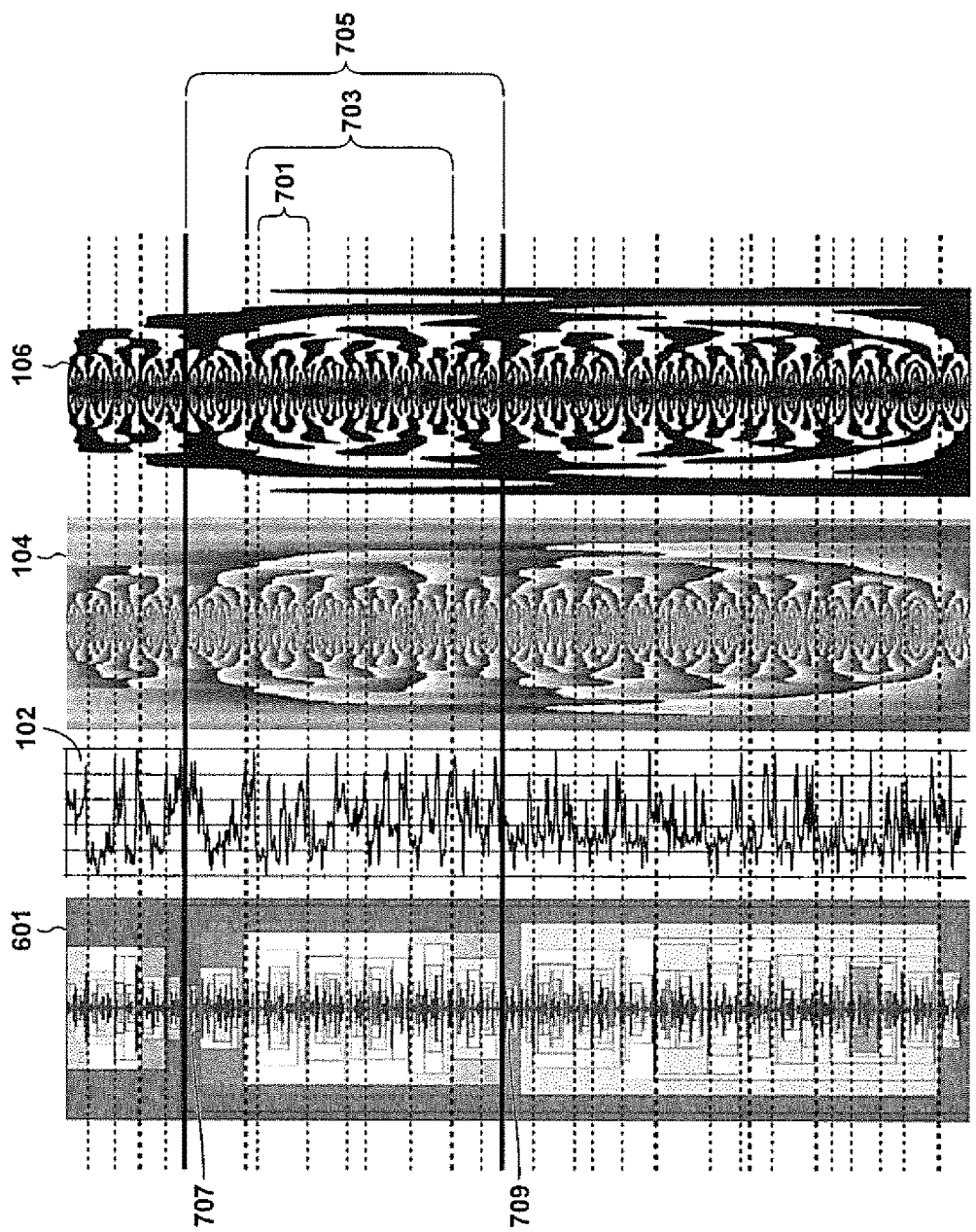
FIG. 7 illustrates hierarchical geological intervals extracted by the watershed method.

FIG. 7 presents the hierarchical geological intervals extracted by watershed method. As in FIG. 6, the final watershed box image 601, input well log signal 102, CWT phase image 104, and binarized CWT phase image 106 are displayed. The two thick solid lines 705 delineate three intervals of distinct signal styles which are difficult to discern with inexperienced eyes without the help of the CWT phase image 104. The large-scale boundaries of distinct signal styles correspond to changes in depositional environment and/or unconformity and may correspond to sequence boundaries. The small boxes such as 707 and 709 near these two large-scale boundaries correspond to transition intervals. The sub-intervals such as 701 and 703 within the larger interval 705 may correspond to parasequencesets, bedsets, etc. in terms of sequence stratigraphy.

Significance-of-Cone Method:

As described previously, another way to extract the hierarchical interval information carried by the oval shapes on the phase image is to characterize the significance of the smoothed cones located at the joining points of the adjacent ovals above and below. At the position (or depth) of an important boundary point of a signal, a large cone area with smoothed phase change opens up from small wavelet scales at the center of the mirrored phase image to large wavelet scales at both sides of the mirrored phase image. As shown in FIG. 11, the larger the smoothed cones, the more important the boundaries are.

The concept of cone of influence (COI) has been described in the literature (Mallat, S. *A Wavelet Tour of Signal Processing*, London: Academic Press, 1999, p. 174). In a scale-space plane, at each scale, the COI determines the set of wavelet coefficients influenced by the value of the signal at a specified position. The effect of oval shapes on mirrored phase image is caused by the smoothed phase changes in the COI's of the boundary points. The more important the boundary points, the larger wavelet scales the smoothed cones extend.

Figure 12:
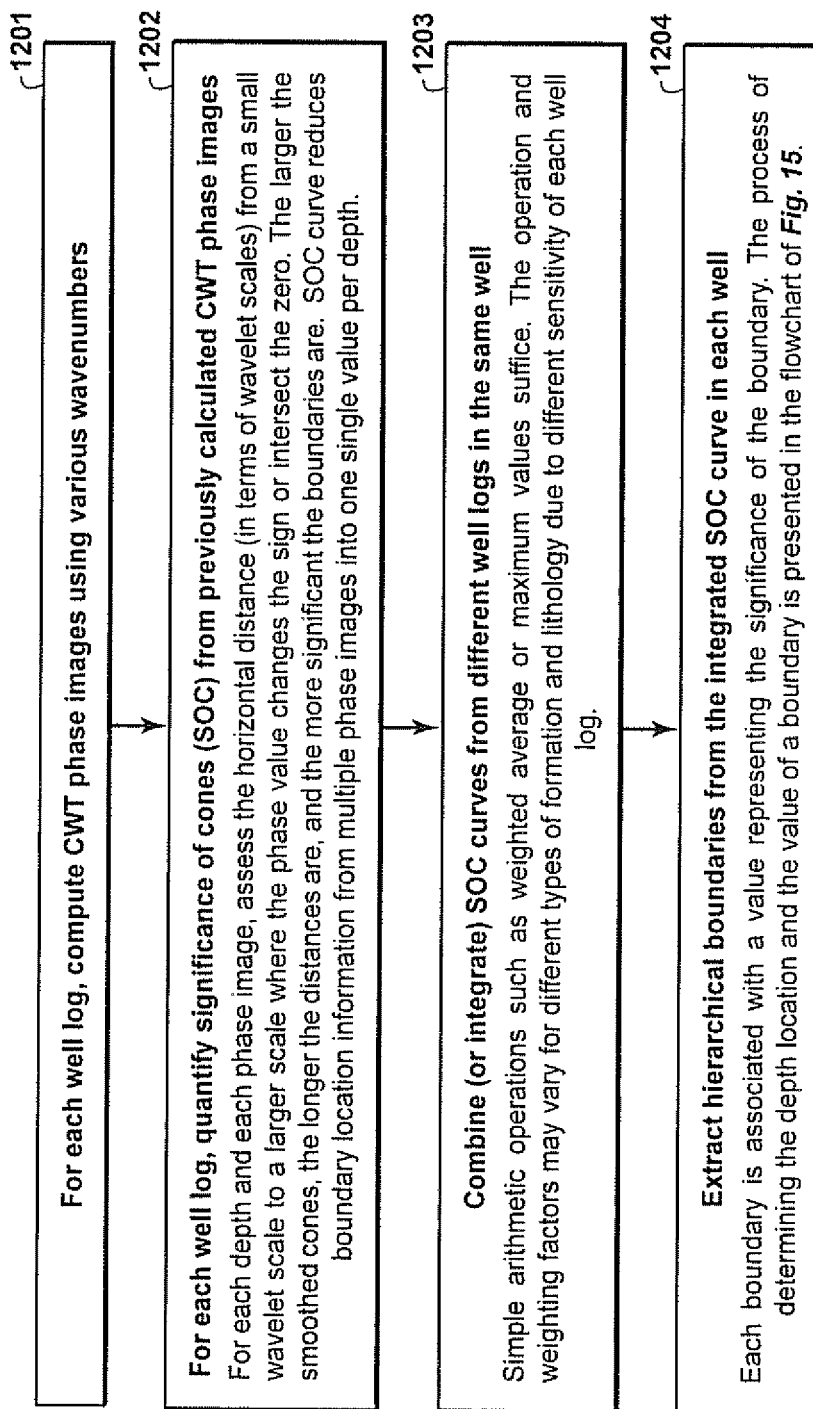
FIG. 12 is an exemplary flowchart of significance-of-cone method used to extract hierarchical boundaries from multiple well logs.

Significance-of-cone method can be a preferred technique because it can integrate boundary information embedded in different types of well logs. This method first extracts a significance-of-cone (SOC) curve from each well log, which reduces the boundary location information from multiple phase images of an input signal into one single value per depth. The SOC curves from different wells logs are then combined. Finally the hierarchical boundaries are generated from the integrated SOC curve. The significance-of-cone method extracting hierarchical boundary information from multiple well logs using CWT phase images is described below and the corresponding flowchart is presented in FIG. 12.

Figure 13:
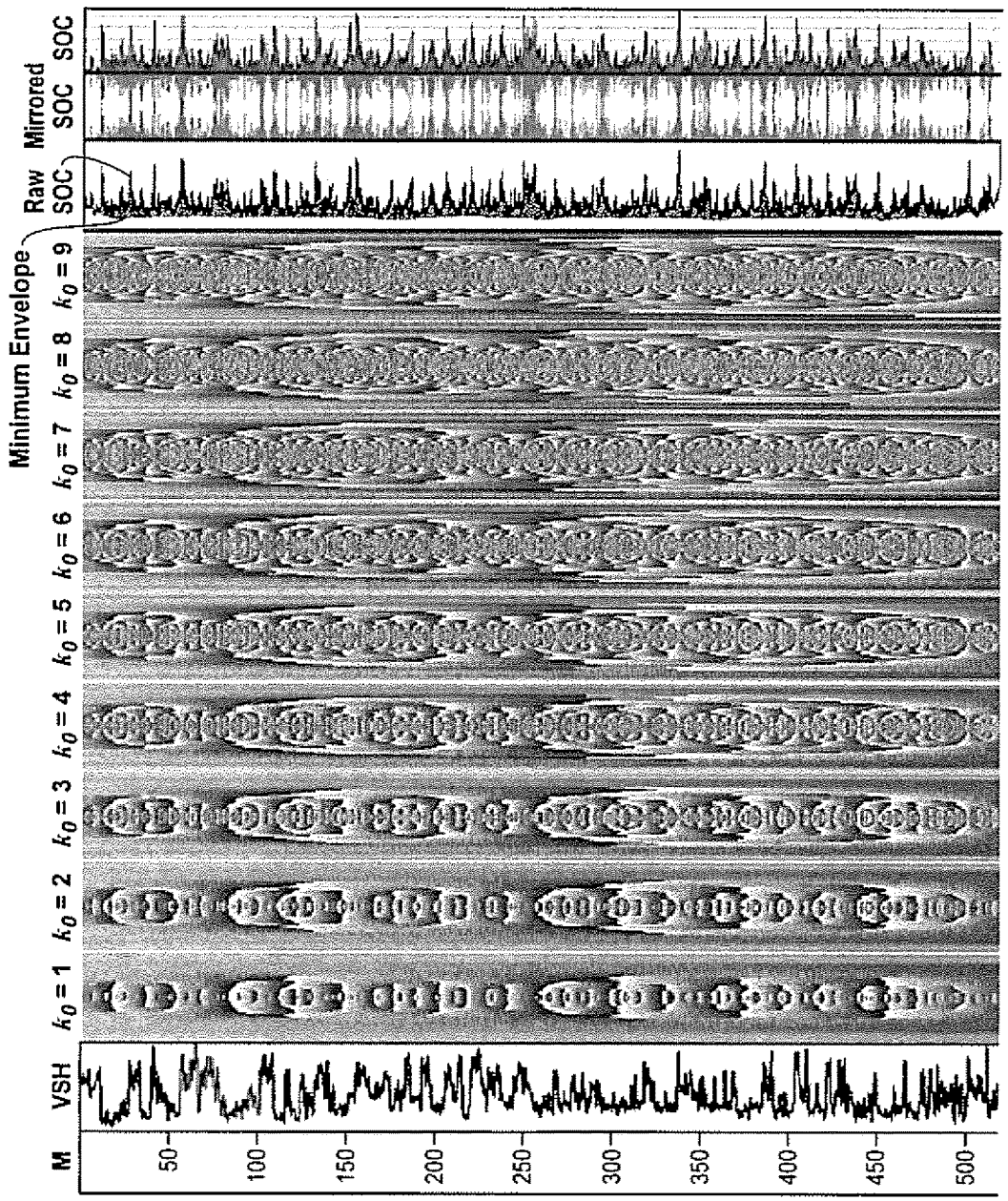
FIG. 13 illustrates exemplary CWT phase images of a well-log signal computed using various wavenumbers, and the significance-of-cone (SOC) curve derived from these phase images.

Step 1201 computes CWT phase images of each well log using various wavelet parameters such as wavenumbers. As described in step 201, the present technological advancement is not limited to a specific basic wavelet, however, the complex-valued Morlet wavelet (Morlet et al., 1982) is used in this document to demonstrate the results. The phase images of different values of wavenumbers, $k_0$, were generated from each well log. FIG. 13 shows phase images of a VSH curve calculated using different $k_0$. Smaller $k_0$ is useful to detect major low-frequency boundaries; and larger $k_0$, to locate sharp high-frequency boundaries. Based on the tests, using $k_0$ values from 1 to 9, as illustrated in FIG. 13, provides reliable results for subsequent processing.

The calculation of phase images is computationally intense. Although its complexity has largely reduced by FFT as described in step 201, if the computer is equipped with multiple cores, the step 1201 can be further accelerated by parallelizing the phase images computation where each phase image can be evaluated independently.

Step 1202 quantifies the significance of cones (SOC) from CWT phase images generated in step 1201. The significance of the smoothed cones on a phase image is estimated based on the smoothness of the phase values through different wavelet scales using zero-crossing distance (ZCD) at each depth. On a phase image, the ZCD, $Z_i$, at each depth is defined as the horizontal distance in terms of wavelet scales on the phase image from a given small wavelet scale $s_i$ to a larger wavelet scale $s_j$ where $\theta_j$, the value of the phase at $s_j$, intersects the zero or changes the sign from $\theta_i$, the phase at $s_i$. The $Z_i$ can be formulated as $$Z_i = \delta_j - \delta_i$$

where $s_i = 2\pi\delta_i^2$ and $s_j = 2\pi\delta_j^2$; the $s_i \geq s_{min}$ (minimum wavelet scale of the phase image), and the $s_j \leq s_{max}$ (maximum wavelet scale of the phase image) and $$\text{sign}(\theta_j) \neq \text{sign}(\theta_i)$$

As described previously, the phase images are computed using wavelet scales $s = 2\pi\delta^2$, where s increases exponentially with $\delta$ being a fixed valued increment.

Figure 14:
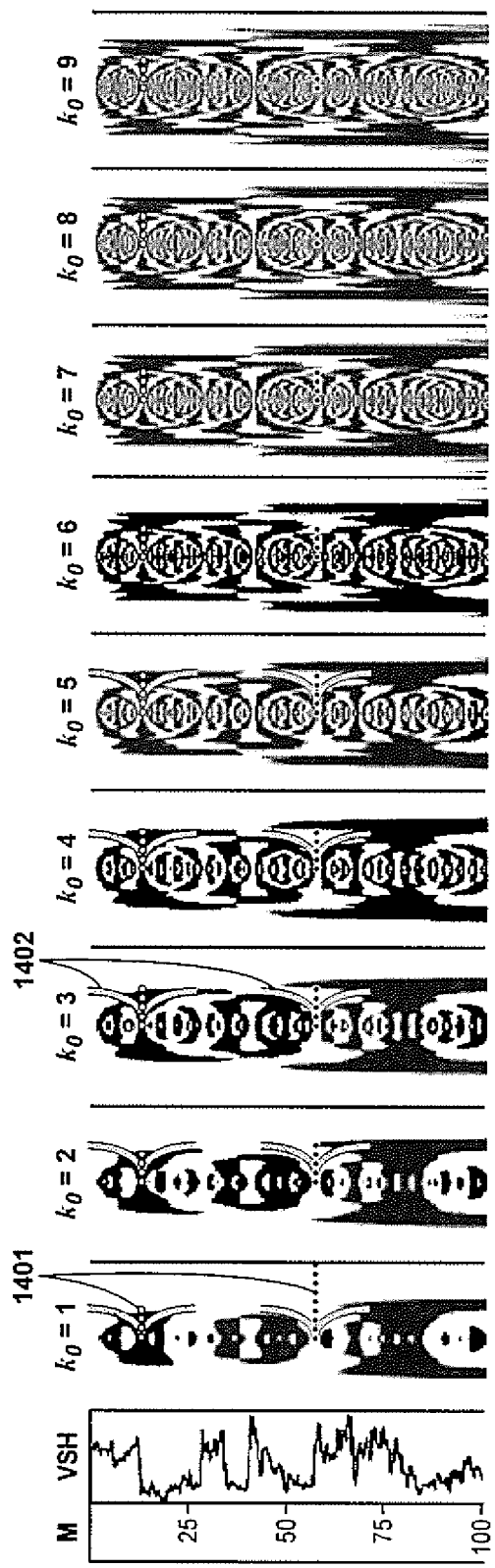
FIG. 14 illustrates exemplary zero-crossing distances (ZCD) which are used for evaluating SOC curves.

The larger the smoothed cones 1402, the longer the ZCD's are, and the more significant the boundaries are. FIG. 14 illustrates a few examples of ZCD's, denoted by dashed lines 1401, from the smallest scale at the center of the mirrored phase images to where the phase value intersects zero. The phase images in FIG. 14 are binarized where white represents positive values and black, negatives.

Due to the complexity of the phase changes at different scales where the zero-phase lines may be wiggly and irregular, the quantification of SOC using ZCD is more robust by combining ZCD's with various starting scale $s_i$, where $s_i$ can be defined by any types of functions. The present technological advancement is not limited to a specific function of $s_i$. Yet, a simple function of $s_i$ is used to demonstrate the results in this document. The starting scale $s_i$ for assessing ZCD increases exponentially with $s_i = 2\pi\Delta^2$ from the $s_{min}$ up to about ⅔ of the $s_{max}$ where $\Delta$ is a fixed valued increment which can be much greater than $\delta$.

The ZCD's from all different starting scales and from phase images of different wavenumbers are summed up to create the raw SOC curve of the input well log. An example of a raw SOC curve is displayed in FIG. 13. One can observe strong boarder effect at the top and bottom of the raw SOC curve. The final SOC curve is therefore normalized by subtracting the minimum envelope of the SOC curve to remove the boarder effect. The SOC normalization process is preferred, but optional. The minimum envelope of the SOC can be obtained from a number of different ways. The present technological advancement is not limited to a specific method to normalize the SOC curve or to calculate the minimum envelope curve. A simple iteratively linear-interpolated minimum envelope is used for the example displayed in FIG. 13. The corresponding final SOC curve is presented in the right-most track of FIG. 13. The mirrored SOC curves in the second track from the right of FIG. 13 exhibit oval shapes similar to the corresponding phase images. The SOC curve reduces the boundary location information from multiple phase images of an input signal into one single value per depth.

Step 1203 consists of combining SOC curves derived from different well logs in the same well. In practice, simple arithmetic operations such as weighted averages or maximum values of different SOC curves suffice. However, the present technological advancement is not limited to a specific way to integrate SOC curves from different well logs. Based on the tests, a weighted average of SOC curves provides better results for subsequent processing. Due to different sensitivity of each well log for different reservoir conditions, the weighting factor of each well log may vary based on different types of formations, lithology, reservoir fluids, and drilling conditions, etc. Typically the same set of weighting factors is applicable to the entire field if the conditions stay the same.

Figure 15:
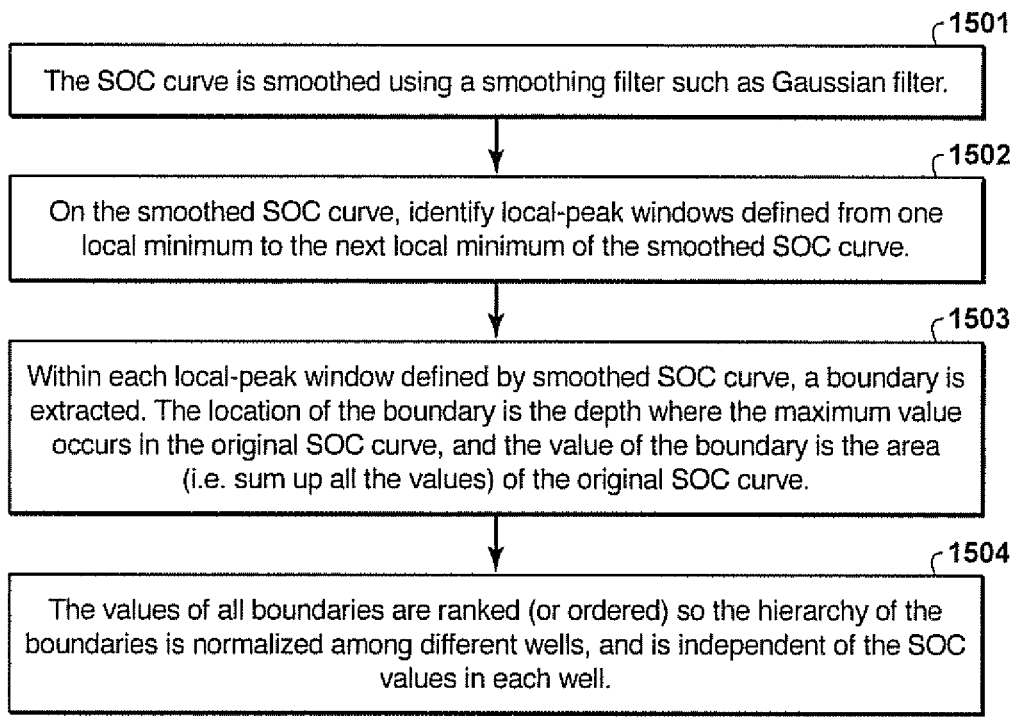
FIG. 15 is an exemplary flowchart for extracting hierarchical boundaries from the integrated SOC curve in each well.
Figure 16:
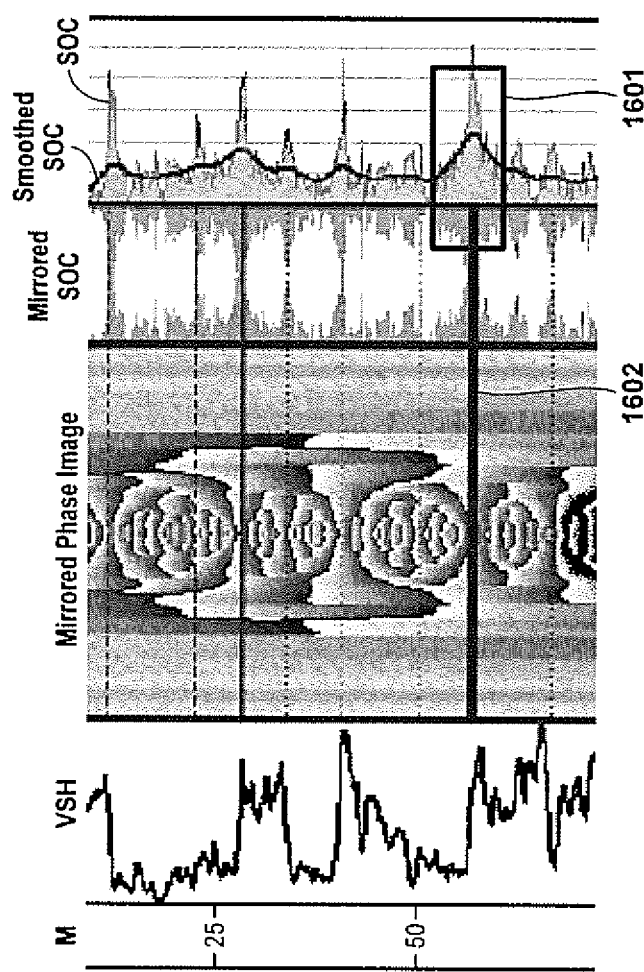
FIG. 16 illustrates an exemplary local-peak window defined by a smoothed SOC curve for generating a boundary from an SOC curve.

Step 1204 extracts hierarchical boundaries from the integrated SOC curve in each well. Each boundary is associated with a depth location and a value representing the significance of the boundary. The process of determining the depth location and the value of a boundary is depicted by the flowchart in FIG. 15. First, the integrated SOC curve is smoothed using a smoothing filter such as Gaussian filter. Second, a boundary is identified within each local-peak window which is defined from one local minimum to the next local minimum of the smoothed SOC curve. An example of a local-peak window 1601 defined by a smoothed SOC is illustrated in FIG. 16. The location of the boundary 1602 is the depth where the maximum value occurs in the original SOC curve, and the value of the boundary is the area (i.e. sum up all the values) of the original SOC curve within the local-peak window defined by smoothed SOC curve. Finally, the values of all boundaries are ranked (or ordered) so the hierarchy of the boundaries is normalized among different wells, and is independent of the SOC values in each well.

Figure 17:
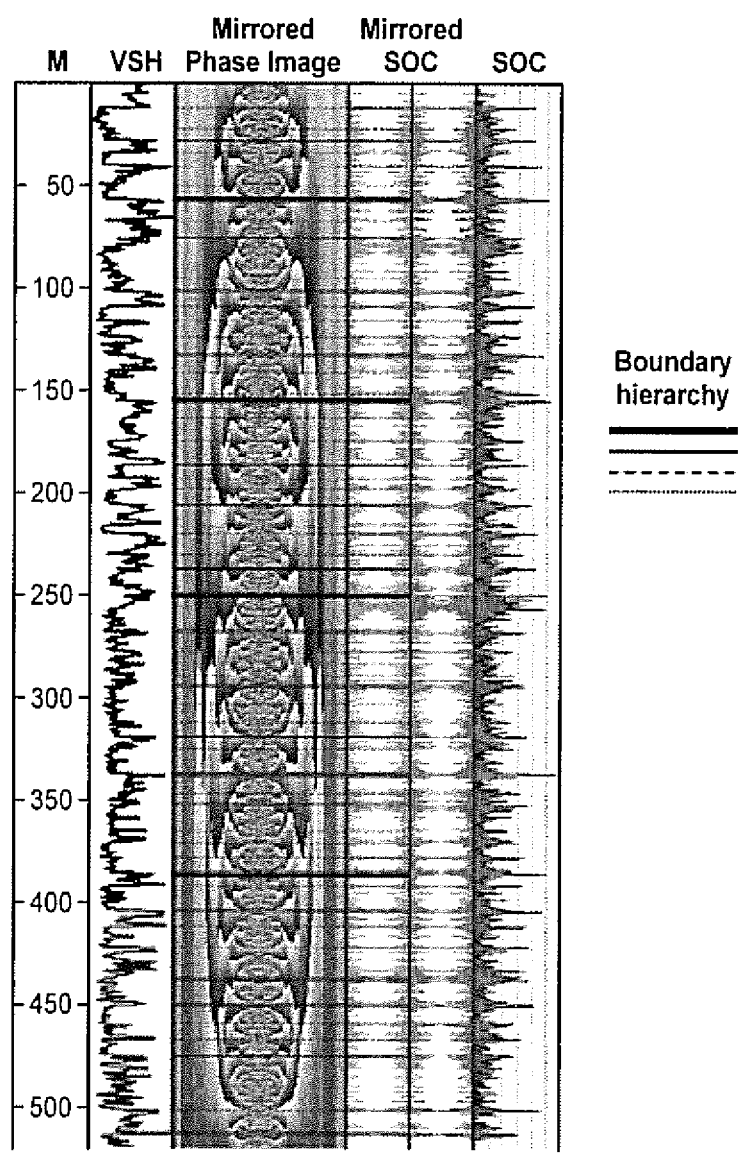
FIG. 17 illustrates exemplary hierarchical boundaries extracted from the significance-of-cone method.

The final hierarchical boundaries obtained by significance-of cone method are displayed in FIG. 17 using the VSH example. One can verify the validity of the final hierarchical boundaries extracted using this method versus the visually inspected VSH curve, CWT phase images and SOC curves.

Figure 8:
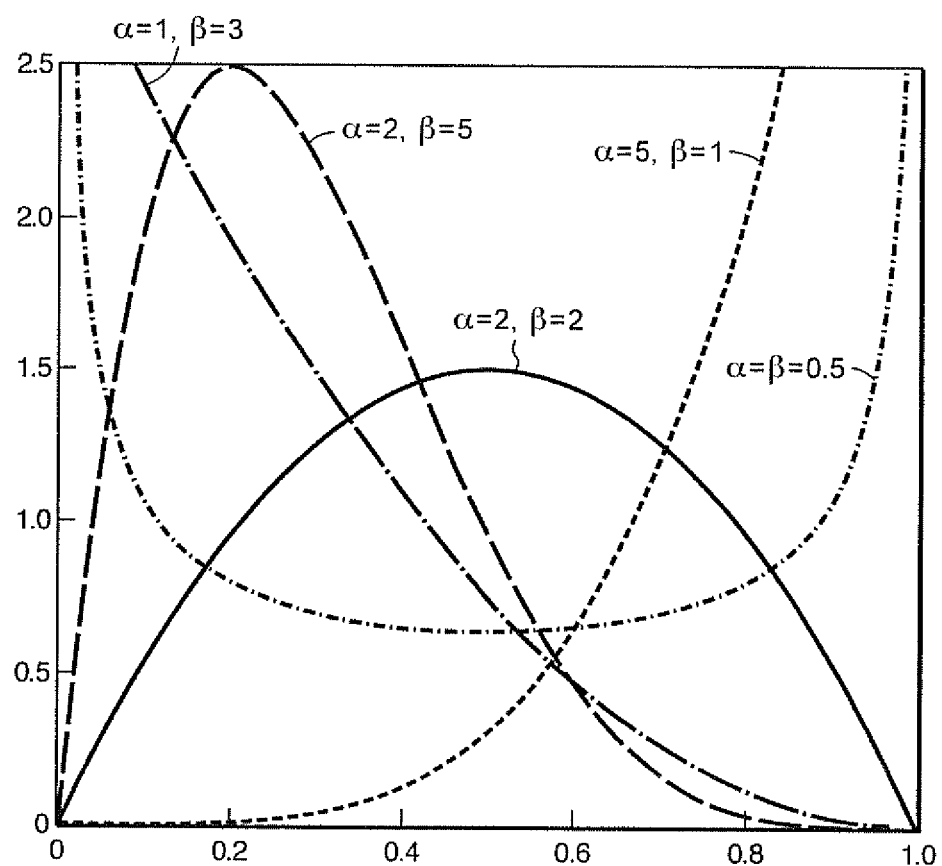
FIG. 8 illustrates exemplary beta distribution curves.

Step 203: Characterize the Curve Shape of Each Interval Using Beta Distribution, and Summarize the Curve Shapes of Multi-Well Intervals in its Shape Parameter Crossplot:

Beta distribution gives the probability density of a value x bounded within the interval (0, 1):

$$\text{Beta}(\alpha, \beta): \ prob(x \mid \alpha, \beta) = \frac{x^{\alpha-1}(1-x)^{\beta-1}}{\int_0^1 t^{\alpha-1}(1-t)^{\beta-1} dt} \quad (6)$$

where the denominator is a beta function, and $\alpha$ and $\beta$ are two shape parameters which can describe a full spectrum of curve shapes within an interval. FIG. 8 shows some example curves using different values of $\alpha$ and $\beta$.

Figure 9:
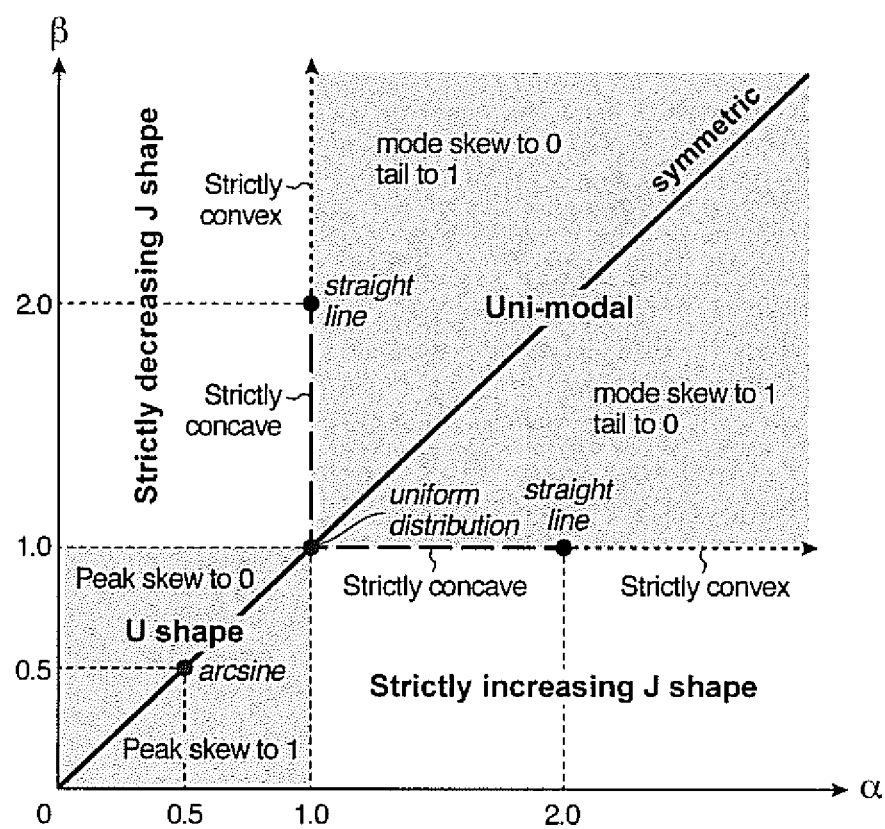
FIG. 9 illustrates an exemplary $\alpha$-$\beta$ crossplot of beta distribution.

Different curve shapes defined by various $\alpha$ and $\beta$ values are summarized on the $\alpha$-$\beta$ crossplot shown in FIG. 9. The curve shape of an interval extracted from any segmentation method, preferably the methods described above, can be characterized by a pair of $\alpha$ and $\beta$ parameters using any curve fitting technique. The present technological advancement is not limited to a specific beta distribution fitting technique.

The incomplete beta function has no closed-form expression, i.e. there is no analytical solution for beta distribution curve fitting. Therefore, the parameters must be approximated numerically. In 2000, van Dorp and Mazzuchi proposed a two-quantile constraint method (J. R. van Dorp and T. A. Mazzuchi, 2000, *Solving for the Parameters of a Beta Distribution under Two Quantile Constraints, in Journal of Statistical Computation and Simulation*, vol. 67, pp. 189-201) to estimate the $\alpha$ and $\beta$ parameters of a beta distribution for any combination of a low quantile ($x_{ql}$, ql) and upper quantile ($x_{qu}$, qu) constraint, where $x_{ql}$ and $x_{qu}$ are the locations of the quantiles ql and qu, respectively. A numerical procedure is described in the paper. The algorithm iteratively estimates the solution of quantile constraint of probability using bisection method until a desired level of accuracy is reached.

Figure 18:
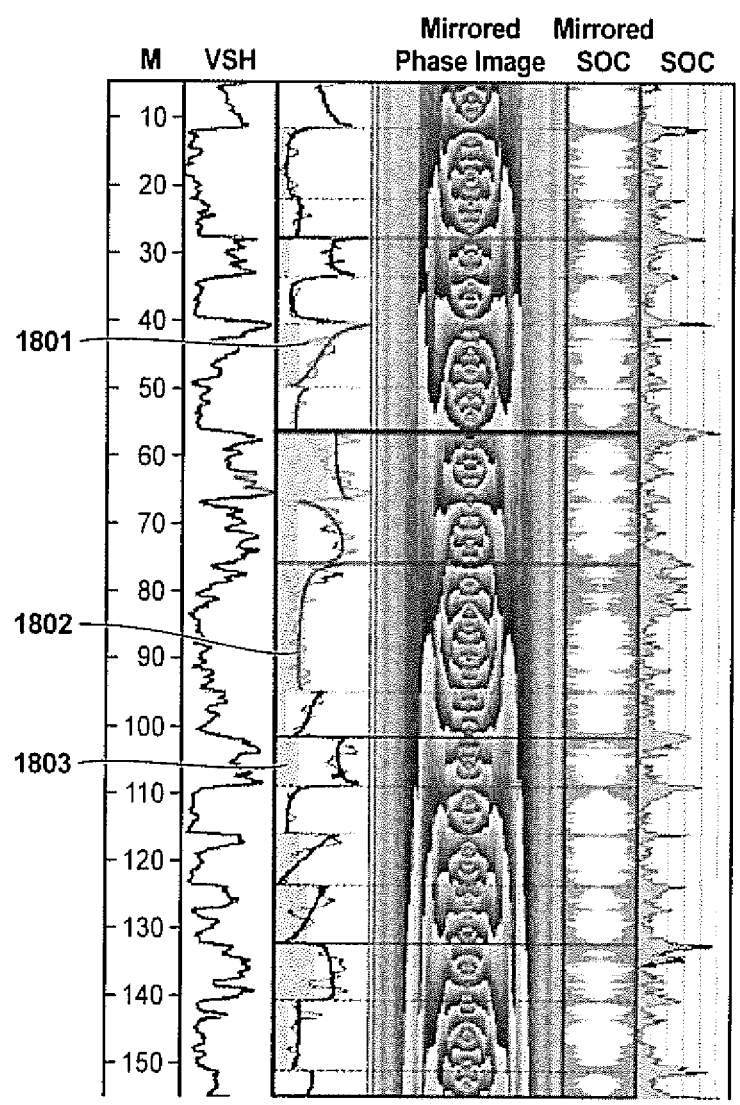
FIG. 18 illustrates exemplary results of beta-distribution fitting.

However, the optimal upper and lower quantiles may vary for different curves. In the present technological advancement, to optimize the beta distribution fitting for an interval of a well log, the two-quantile constraint method is used in combination with an optimization scheme which selects the optimal upper and lower quantiles for a given interval of the input signal by minimizing the average of squared residuals (ASR) between original and fitted curves. Each interval of a well log is divided into Q number of quantiles. All possible combinations of upper and lower quantiles are employed to evaluate the possible solutions. The solution that minimizes the ASR is retained as the final solution. The ASR reduces as the value of Q increases, but the computational complexity increases as well. Based on the tests, no visual improvement (or changes) in the fitted beta distribution curves for Q>~20. FIG. 18 demonstrates the results of beta distribution fitting technique described in this paragraph, with original VSH curve 1801, fitted Beta-distribution curve 1802, and average of squared residuals (gray shades) 1803.

Each fitted beta distribution curve is then represented by a point on an $\alpha$-$\beta$ crossplot. The curve shapes of the same stratigraphic unit from multiple wells can be visualized and interpreted on an $\alpha$-$\beta$ crossplot using these quantified curve-shape parameters. The $\alpha$-$\beta$ crossplot provides an absolute (or invariant) parametric space to interpret the log curve shapes. Multiple wells' log curve-shape patterns of different environments can be analyzed and may be distinguished from one another based on patterns exhibited on the $\alpha$-$\beta$ crossplot (shape-parameter crossplot). This new interpretation technique provides a new way to evaluate and compare, at least to better understand, the 3-D variations of internal structures of different geological formations.

Other curve textural information and characteristics such as interval (or bed) thickness trends, curve activity (or variability), curve envelopes, etc. can also be extracted to assist the interpretation.

Computer Implementation

Figure 10:
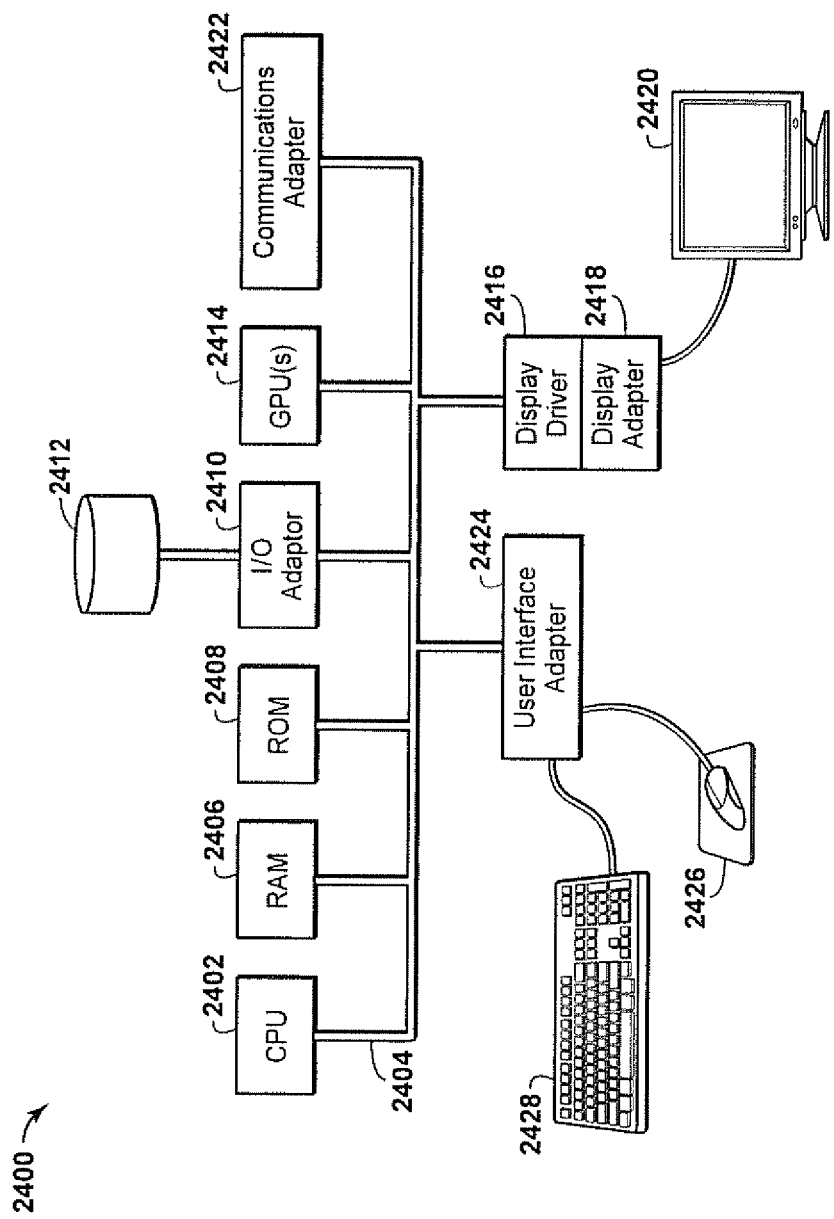
FIG. 10 is an exemplary computer system useable with the present technological advancement.

FIG. 10 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 10, additional CPUs may be present. Moreover, the computer system 2400 may comprise a networked, multi-processor computer system that may include a hybrid parallel CPU/GPU system. The CPU 2402 may execute the various logical instructions according to various teachings disclosed herein. For example, the CPU 2402 may execute machine-level instructions for performing processing according to the operational flow described.

The computer system 2400 may also include computer components such as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, GPU(s) 2414, a communications adapter 2422, a user interface adapter 2424, a display driver 2416, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400.

The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

General Application of the Present Technological Advancement

Although a conventional well log signal 102 is used to illustrate the results in the present technological advancement, other well data or derived data such as petrofacies (or electrofacies) curves, where the petrophysical rock types are ordered in the log-property space (S. J. Ye & Ph. Rabiller, *Automated Electrofacies Ordering, in Petrophysics*, December 2005), can also be used with the present technological advancement. The petrofacies are the integrated information of all available well data; it is more powerful than using a single or a couple of well logs for stratigraphic correlation.

The present technological advancement has a wide spectrum of applications. One of its immediate applications in petrophysics is to locate reliable and significant bed boundaries from well logs which set critical initial conditions to construct earth models for logging tool response modeling and/or inversion. The present technological advancement has been applied to the curves of high-resolution dipmeter (or image) logs for segmenting lithofacies intervals, and has generated exceptional results that are comparable to the lithofacies intervals identified from cores.

The parameter crossplot of a well log or logs and/or subdivided multi-scale intervals of a well log or logs can be used to explore for or manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The foregoing application is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

What is claimed is:

1. A method, comprising:
   obtaining a well log signal from a well penetrating a subsurface region;
   performing a continuous wavelet transform (CWT) of the well log signal and obtaining a mirrored scale-depth or scale-time phase image of the CWT of the well log signal, said phase image comprising oval-shaped circular patterns that correspond to intervals of genetically-related geological packages in the subsurface region; and
   extracting, with a computer, hierarchical multiscale intervals corresponding to the oval-shaped circular patterns of the mirrored scale-depth or scale-time phase image.

2. The method of claim 1, further comprising identifying, within the well log signal, intervals of distinct signal styles using the extracted hierarchical multiscale intervals.

3. The method of claim 1, wherein a wavelet scale of the continuous wavelet transform has a sufficiently large wavelet scale so that an entirety of the well log signal is incorporated within one single oval shape of the scale-depth or scale-time phase image.

4. The method of claim 1, wherein the extracting includes using a watershed method.

5. The method of claim 4, wherein the watershed method includes binarizing the scale-depth or scale-time phase image using progressively increasing thresholds, and analyzing changes of patterns on binarized images of different thresholds.

6. The method of claim 5, wherein the analyzing includes establishing connections between the oval-shaped circular patterns in the binarized images of different thresholds and combining the connected areas of the different thresholds to extract the hierarchical multiscale intervals.

7. The method of claim 1, wherein the intervals of distinct signal styles correspond to different stratigraphic packages.

8. The method of claim 1, wherein the extracting hierarchical multiscale intervals from the scale-depth or scale-time phase image includes using a significance-of-cone method that quantifies a significance of smoothed cones located at tops and bottoms of the oval-shaped circular patterns, wherein the significance-of-cone method includes extracting a significance-of-cone (SOC) curve from the well log signal, which reduces boundary location information from multiple phase images of the well log signal into one single value per depth, combining the SOC curves from different well log signals, and deriving hierarchical boundaries from the combined SOC curve.

9. The method of claim 1, further comprising visualizing and analyzing curve shapes of the well log signal within the intervals using shape parameters of beta distribution on a shape-parameter cross-plot.

10. The method of claim 9, further comprising representing curve shapes from intervals of multiple wells on a shape-parameter crossplot.

\* \* \* \* \*